US012533589B2

(12) United States Patent
Biwasaka et al.

(10) Patent No.: US 12,533,589 B2
(45) Date of Patent: Jan. 27, 2026

(54) STORAGE MEDIUM STORING GAME PROGRAM, GAME SYSTEM, GAME APPARATUS, AND GAME PROCESSING METHOD

(71) Applicant: NINTENDO CO., LTD., Kyoto (JP)

(72) Inventors: Shinichiro Biwasaka, Kyoto (JP); Atsushi Asakura, Kyoto (JP); Naoya Yamamoto, Kyoto (JP); Tadashi Sakamoto, Kyoto (JP); Corey Michael Bunnell, Kyoto (JP); Yuya Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 285 days.

(21) Appl. No.: 18/328,641

(22) Filed: Jun. 2, 2023

(65) Prior Publication Data

US 2024/0082732 A1 Mar. 14, 2024

(30) Foreign Application Priority Data

Sep. 12, 2022 (JP) ................................ 2022-144901

(51) Int. Cl.
*A63F 13/56* (2014.01)
*A63F 13/5378* (2014.01)
(Continued)

(52) U.S. Cl.
CPC .......... *A63F 13/60* (2014.09); *A63F 13/5378* (2014.09); *A63F 13/56* (2014.09); *A63F 13/58* (2014.09)

(58) Field of Classification Search
CPC .......... A63F 13/25; A63F 13/45; A63F 13/52; A63F 13/537; A63F 13/5372;
(Continued)

(56) References Cited

U.S. PATENT DOCUMENTS

2008/0146328 A1* 6/2008 Ishii .................... A63F 13/2145 463/31
2013/0165233 A1* 6/2013 Wada ...................... A63F 13/46 463/42
(Continued)

FOREIGN PATENT DOCUMENTS

JP 2008-148860 7/2008
JP 2013-152686 8/2013

OTHER PUBLICATIONS

Feb. 26, 2024 Office Action issued in Japanese Patent Application No. 2022-144901, pp. 1-5 [machine translation included].
(Continued)

*Primary Examiner* — Omkar A Deodhar
(74) *Attorney, Agent, or Firm* — Nixon & Vanderhye PC

(57) ABSTRACT

Movement control of a player character in a field in a virtual space is performed based on a user's operation input. At least one first type of object is disposed in the field. Lightness for the first type of object is set such that the first type of object is visually recognized even when the field is dark. When the player character satisfies a first condition at a location where one of the at least one first type of object is disposed, lighting is set in the virtual space such that a range in the field including the location is lighter than before the first condition is satisfied.

20 Claims, 30 Drawing Sheets

(51) Int. Cl.
*A63F 13/58* (2014.01)
*A63F 13/60* (2014.01)

(58) Field of Classification Search
CPC .......... A63F 13/55; A63F 13/56; A63F 13/58; A63F 13/60; A63F 13/5378; A63F 2300/305; A63F 2300/306; A63F 2300/609; A63F 2300/65; A63F 2300/6692
See application file for complete search history.

(56) References Cited

U.S. PATENT DOCUMENTS

| | | | | |
|---|---|---|---|---|
| 2018/0099224 | A1* | 4/2018 | Kiyomoto | A63F 13/25 |
| 2018/0104577 | A1* | 4/2018 | Kiyomoto | G06F 3/0481 |
| 2020/0078683 | A1* | 3/2020 | Anabuki | G06T 13/20 |

OTHER PUBLICATIONS

Shinya Harimoto, SE-MOOK Valkyrie Profile 2—Silmeria—Official Complete Guide Valkyrie Profile—Silmeria—Official Complet Guide, 1st edition, Square Enix Co., Ltd., Aug. 24, 2006, pp. 18, 138.

Studio-M Co., ltd., Radiant Historia Official Complete Guide, 1st edition, Enterbrain Inc., Dec. 22, 2010, pp. 10, 11, 13,16.

TatraEdit Co.Ltd., a thorough guide to enjoy Minecraft 100 times more, 1st edition, Sotechsha Co.Ltd., Junichi Yanagisawa, Jun. 15, 2015, pp. 64, 67.

Noriomi Ito, PlayStation Portable version compatible Shin Sangoku Musou 5 Special Guidebook vol. 1, 1st edition, Koei Co., Ltd., Yoichi Erikawa, Oct. 14, 2009, pp. 68, 69, 206.

The Legend of Zelda Breath of the Wild: Nintendo Official Guide-book, Shogakukan Inc., May 11, 2017, page 211, with English translation.

* cited by examiner

STORAGE MEDIUM STORING GAME PROGRAM, GAME SYSTEM, GAME APPARATUS, AND GAME PROCESSING METHOD

CROSS REFERENCE TO RELATED APPLICATION

This application claims priority to Japanese Patent Application No. 2022-144901, filed on Sep. 12, 2022, the entire contents of which are incorporated herein by reference.

FIELD

The technology disclosed herein relates to game program-storing storage media, game systems, game apparatuses, and game processing methods that perform a process using a player character in a virtual space.

BACKGROUND AND SUMMARY

There has conventionally been a game apparatus that executes a game program for exploring a dark region in a virtual space using a light source. For example, in such a game apparatus, a player character is enabled to explore a dark region by moving while carrying a light source such as a torch in a particular scene in a game.

However, the above game apparatus is not suitable for exploration of a large dark region.

With the above in mind, it is an object of the present example to provide a game program-storing, computer-readable storage medium, game system, game apparatus, and game processing method capable of facilitating exploration of a region in a virtual space.

To achieve the object, the present example may have features (1) to (7) below, for example.

(1)

An example configuration of a non-transitory computer-readable storage medium having stored therein a game program causes a computer of an information processing apparatus to perform operations comprising: performing movement control of a player character in a field in a virtual space, based on a user's operation input; disposing at least one first type of object in the field; setting lightness for the first type of object such that the first type of object is visually recognized even when the field is dark; and when the player character satisfies a first condition at a location where one of the at least one first type of object is disposed, setting lighting in the virtual space such that a range in the field including the location is lighter than before the first condition is satisfied.

With the configuration of (1), the range including the location of the first type of object is illuminated by lighting that is set in the virtual space based on the first type of object, which facilitates exploration of the range in the field in the virtual space.

(2)

In the configuration of (1), the game program may further cause the computer to perform operations comprising: for a field map indicating map information of the field, performing map image displaying so as to display an image not including first map information for a range in a first map state, and a map image including the first map information for a range in a second map state, according to the user's choice operation input; and when the first condition is satisfied, changing a range in the field map related to surroundings of the first type of object disposed at a location where the first condition is satisfied, from the first map state to the second map state.

With the configuration of (2), the displayed map is changed to the second map state including the first map information, and lighting is set in the virtual space. Therefore, the user can more easily explore a field in the virtual space using a map of the field.

(3)

In the configuration of (2), a damage area may be set on a terrain object of the field. The first map information may include map information indicating the damage area. The game program may further cause the computer to perform operations comprising: when it is determined that the player character has touched the damage area on the terrain object, reducing at least one of a physical strength value of the player character and the upper limit of the physical strength value.

With the configuration of (3), a map image shows a location where damage is caused to the player character, and therefore, the player character is enabled to move and explore in a field in the virtual space while avoiding damage.

(4)

In the configuration of (2) or (3), the game program may further cause the computer to perform operations comprising: when a mark indicating a location of the first type of object in a range of a displayed map image in the first map state is chosen based on the user's choice operation input, moving the player character to a location in the virtual space related to the chosen mark.

With the configuration of (4), the player character can be quickly moved from anywhere to the location of the first type of object indicated by a map, which facilitates exploration of a field using the first type of object as a hub.

(5)

In any one of the configurations (1) to (4), a damage area may be set on a terrain object of the field. The game program may further cause the computer to perform operations comprising: when it is determined that the player character has touched the damage area on the terrain object, reducing at least one of a physical strength value of the player character and the upper limit of the physical strength value; and when the player character is disposed in a region around the first type of object after the first condition is satisfied, restoring at least one of the physical strength value of the player character and the upper limit of the physical strength value.

With the configuration of (5), by moving to the location of the first type of object, the physical strength value or the upper limit of the physical strength value reduced in the damage area can be restored. The first type of object can be used as a stopover for exploration of a field, which facilitates exploration of a field.

(6)

In any one of the configurations of (1) to (5), the game program may further cause the computer to perform operations comprising: disposing a first item object possessed by the player character on a terrain object of the field, or disposing a second item object on a terrain object of the field instead of the first item object possessed by the player character, according to the player character's action in the virtual space, to set lighting in the virtual space such that a range around a location on the terrain object where the first or second item object is disposed is lighter than before the first or second item object is disposed.

With the configuration of (6), by setting the first or second item object on a terrain object, surroundings of the item object are illuminated, and therefore, a field can be continuously explored with a dark space illuminated.

(7)

In the configuration of (6), the game program may further cause the computer to perform operations comprising: executing a process of causing the player character to perform an action of launching the first item object in the virtual space, based on the user's operation input; and installing the first or second item object at a location where the first item object launched according to the launching action has hit the terrain object.

With the configuration of (7), a range away from the player character can be illuminated, and therefore, a large field can be more continuously explored.

The present example may also be carried out in the form of a game system, game apparatus, and game processing method.

According to the present example, a range including the location of a first type of object is illuminated by lighting that is set in a virtual space based on the first type of object, which facilitates exploration of a field in the virtual space.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

A game system according to the present example will now be described. An example of a game system 1 according to the present example includes a main body apparatus (information processing apparatus serving as the main body of a game apparatus in the present example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the description that follows, a hardware configuration of the game system 1 of the present example is described, and thereafter, the control of the game system 1 of the present example is described.

Figure 1:
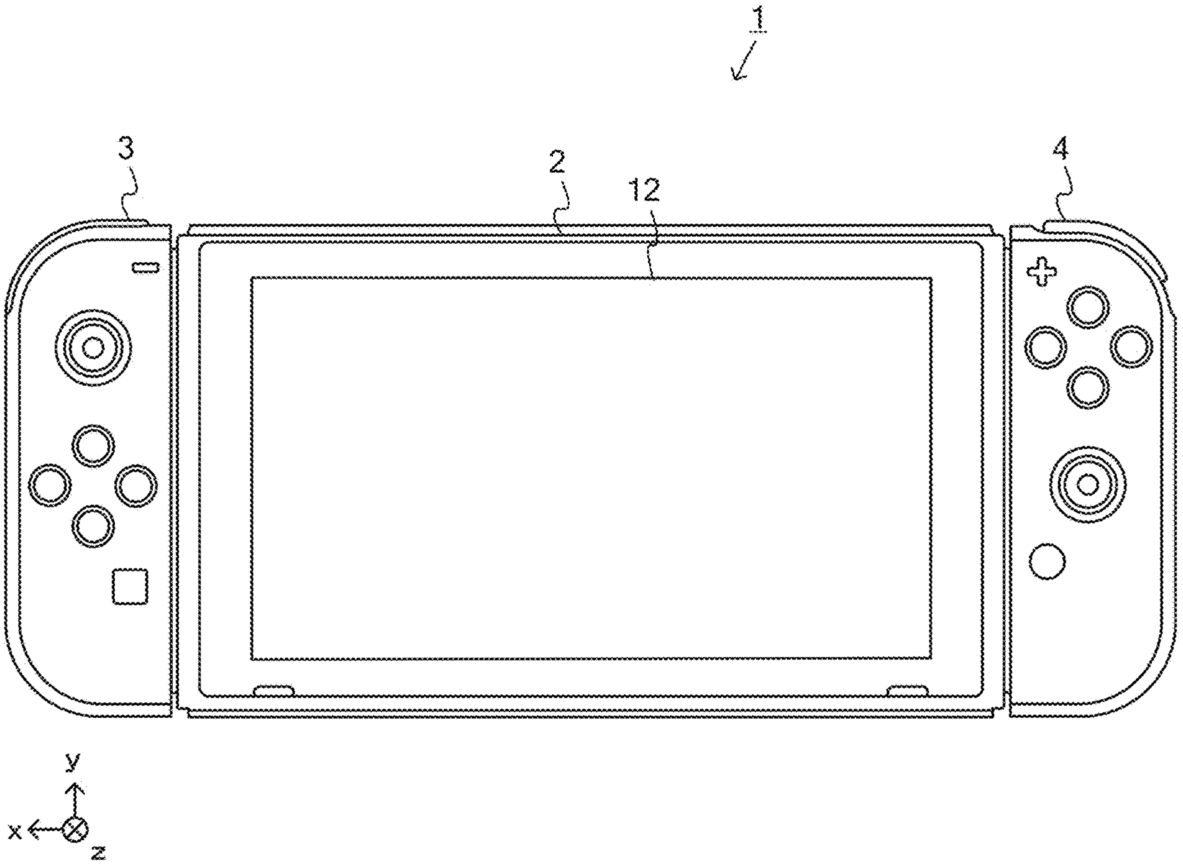
FIG. 1 is a diagram illustrating a non-limiting example of a state where a left controller 3 and a right controller 4 are attached to a main body apparatus 2.

FIG. 1 is a diagram illustrating an example of the state where the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
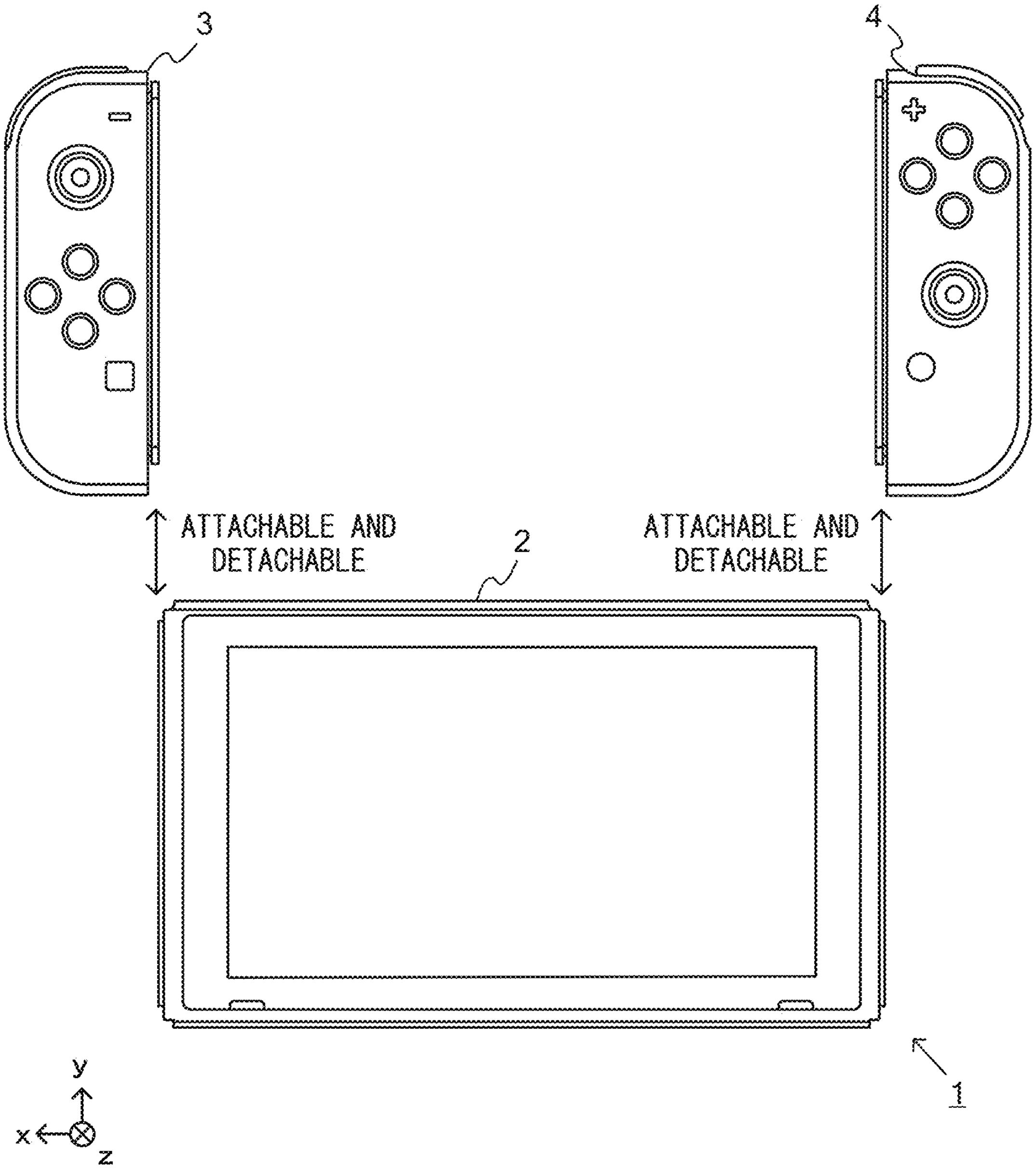
FIG. 2 is a diagram illustrating a non-limiting example of a state where a left controller 3 and a right controller 4 are detached from a main body apparatus 2.

FIG. 2 is a diagram illustrating an example of the state where each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a “controller”.

Figure 3:
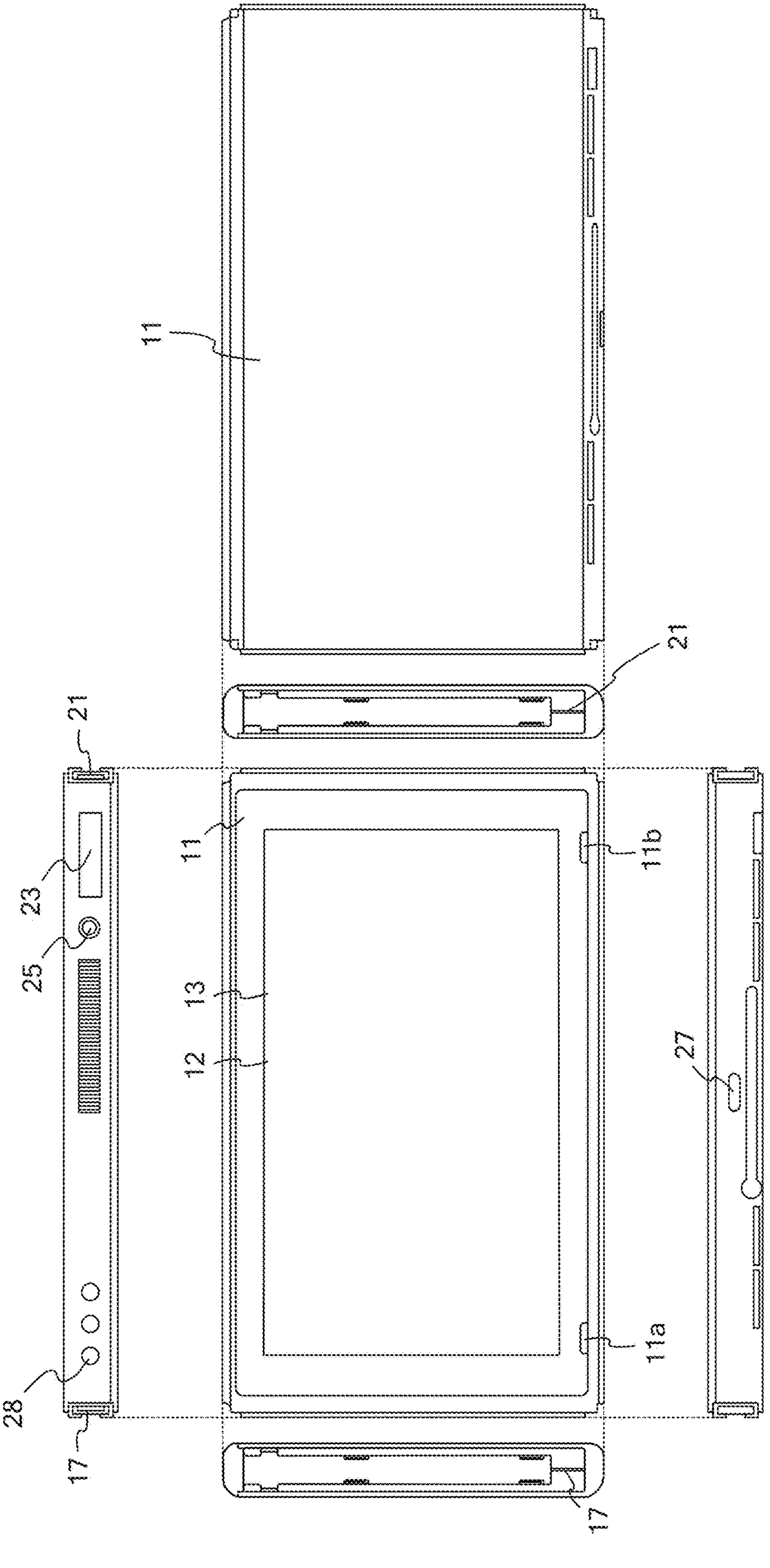
FIG. 3 illustrates six orthogonal views of a non-limiting example of a main body apparatus 2.

FIG. 3 illustrates six orthogonal views of an example of the main body apparatus 2. As illustrated in FIG. 3, the main body apparatus 2 includes an approximately plate-shaped housing 11. In the present example, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present example, the display 12 is a liquid crystal display device (LCD). The display 12, however, may be a display device of any suitable type.

In addition, the main body apparatus 2 includes a touch panel 13 on the screen of the display 12. In the present example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11*a* and 11*b* are formed in the main surface of the housing 11. The speaker 88 outputs sounds through the speaker holes 11*a* and 11*b*.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present example, the cradle has the function of charging the unified apparatus or the main body apparatus 2 alone, being placed thereon. The cradle also functions as a hub device (specifically, a USB hub).

Figure 4:
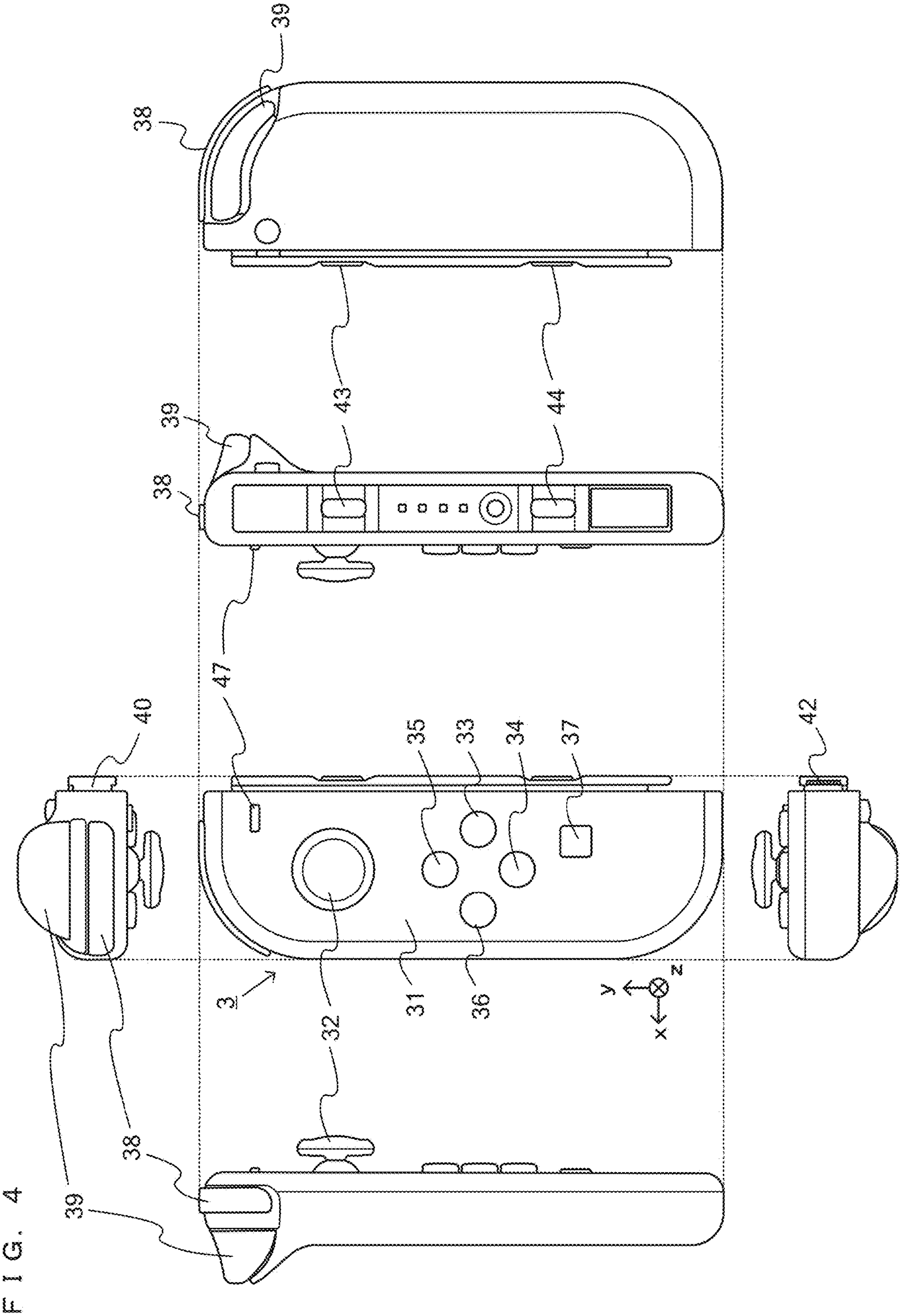
FIG. 4 illustrates six orthogonal views of a non-limiting example of a left controller 3.

FIG. 4 illustrates six orthogonal views of an example of the left controller 3. As illustrated in FIG. 4, the left controller 3 includes a housing 31. In the present example, the housing 31 has a vertically long shape, e.g., is shaped to be long in an up-down direction (i.e., a y-axis direction illustrated in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a “—”

(minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 5:
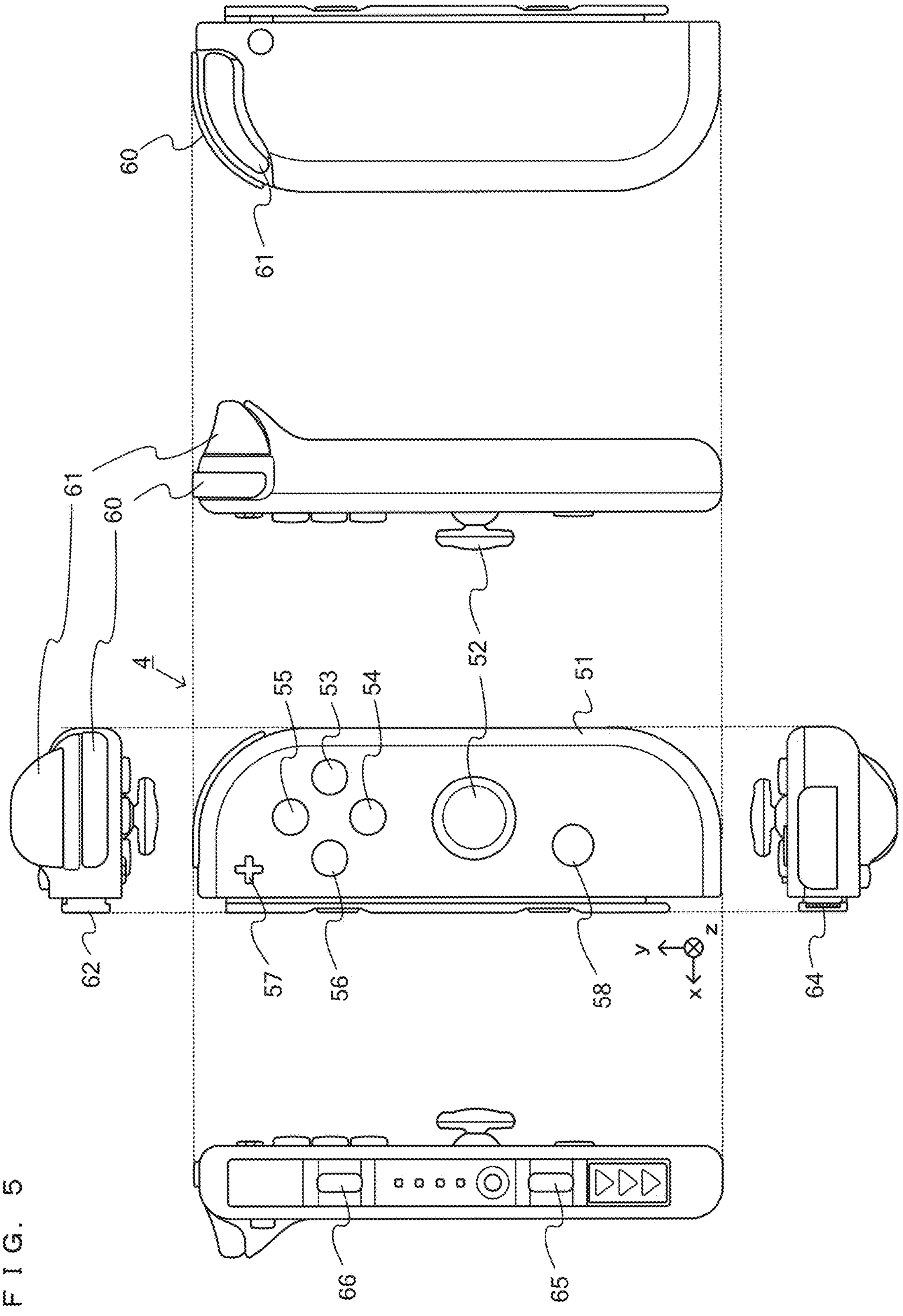
FIG. 5 illustrates six orthogonal views of a non-limiting example of a right controller 4.

FIG. 5 illustrates six orthogonal views of an example of the right controller 4. As illustrated in FIG. 5, the right controller 4 includes a housing 51. In the present example, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
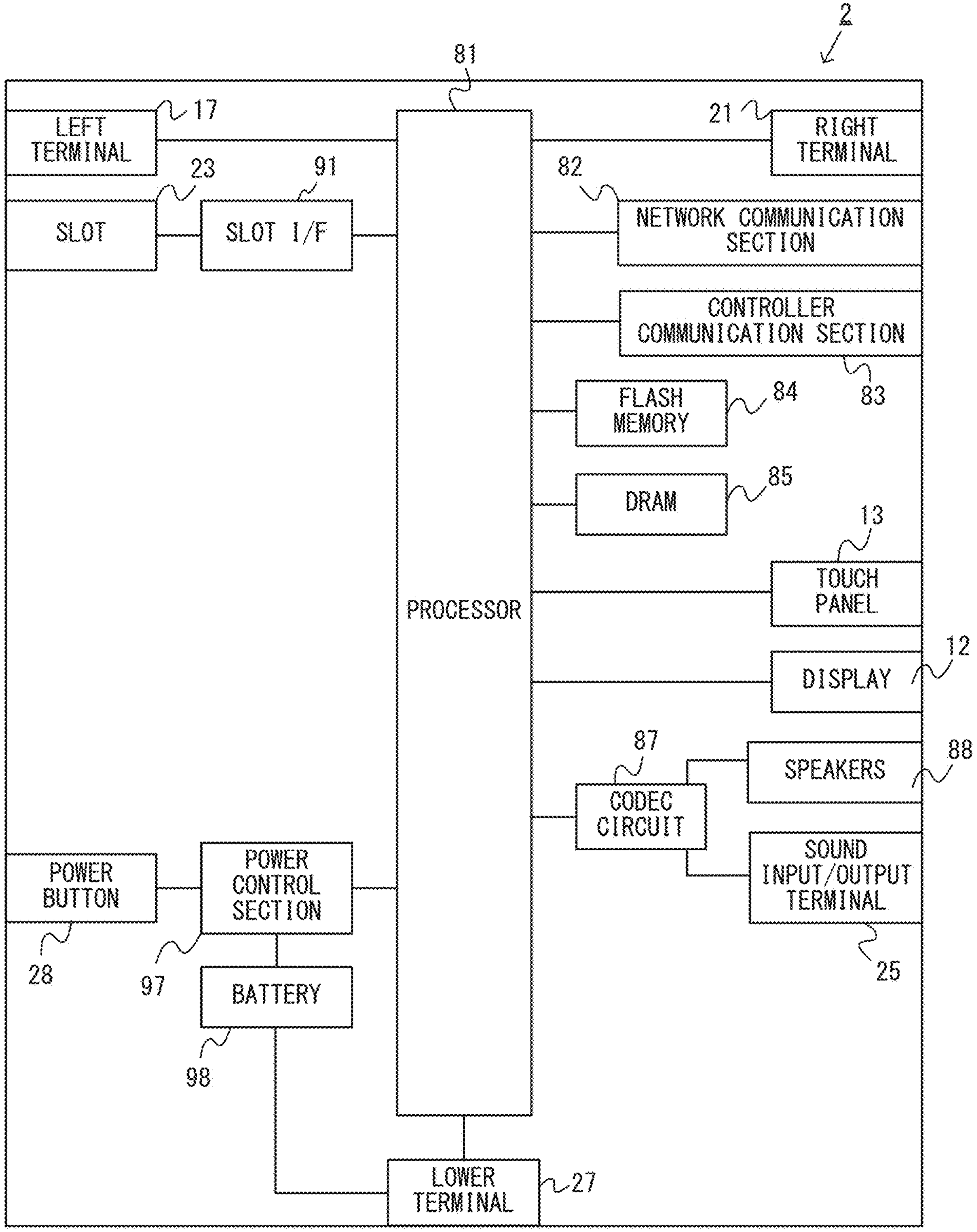
FIG. 6 is a block diagram illustrating a non-limiting example of an internal configuration of a main body apparatus 2.

FIG. 6 is a block diagram illustrating an example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication", in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As an example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 7:
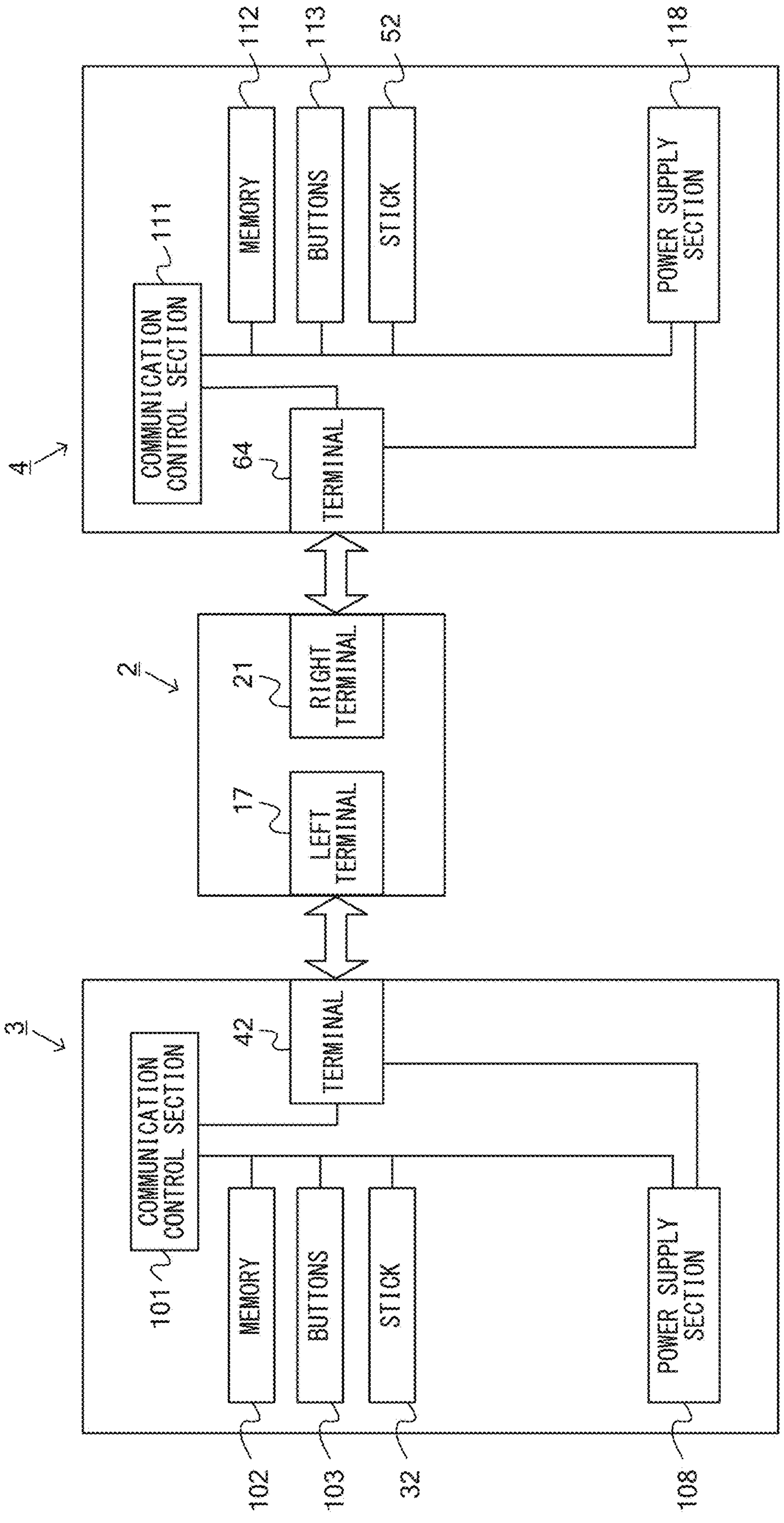
FIG. 7 is a block diagram illustrating non-limiting examples of internal configurations of a main body apparatus 2, a left controller 3, and a right controller 4.

FIG. 7 is a block diagram illustrating examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the present example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and the analog stick

52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to an embodiment in which an image is displayed on the display 12. It should be noted that in the case in which the game system 1 is used in an embodiment in which an image is displayed on the display 12, the game system 1 may be used with the left controller 3 and the right controller 4 attached to the main body apparatus 2 (e.g., the main body apparatus 2, the left controller 3, and the right controller 4 are integrated in a single housing).

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present example, as an example, a game can be played in which a player character PC is moved in a virtual space according to the user's operation performed using the operation buttons, the sticks, and the touch panel 13.

Figure 8:
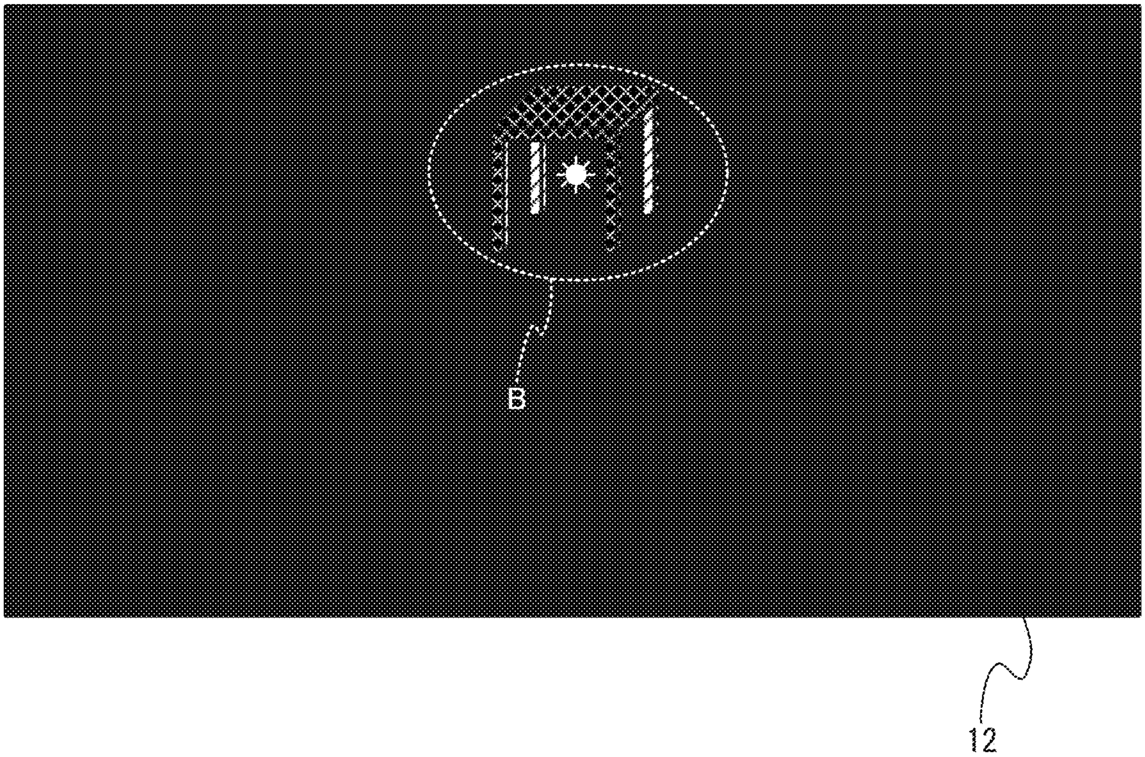
FIG. 8 is a diagram illustrating a non-limiting example of a game image showing a specific construction B in an underground field when the specific construction B is in an initial state.
Figure 9:
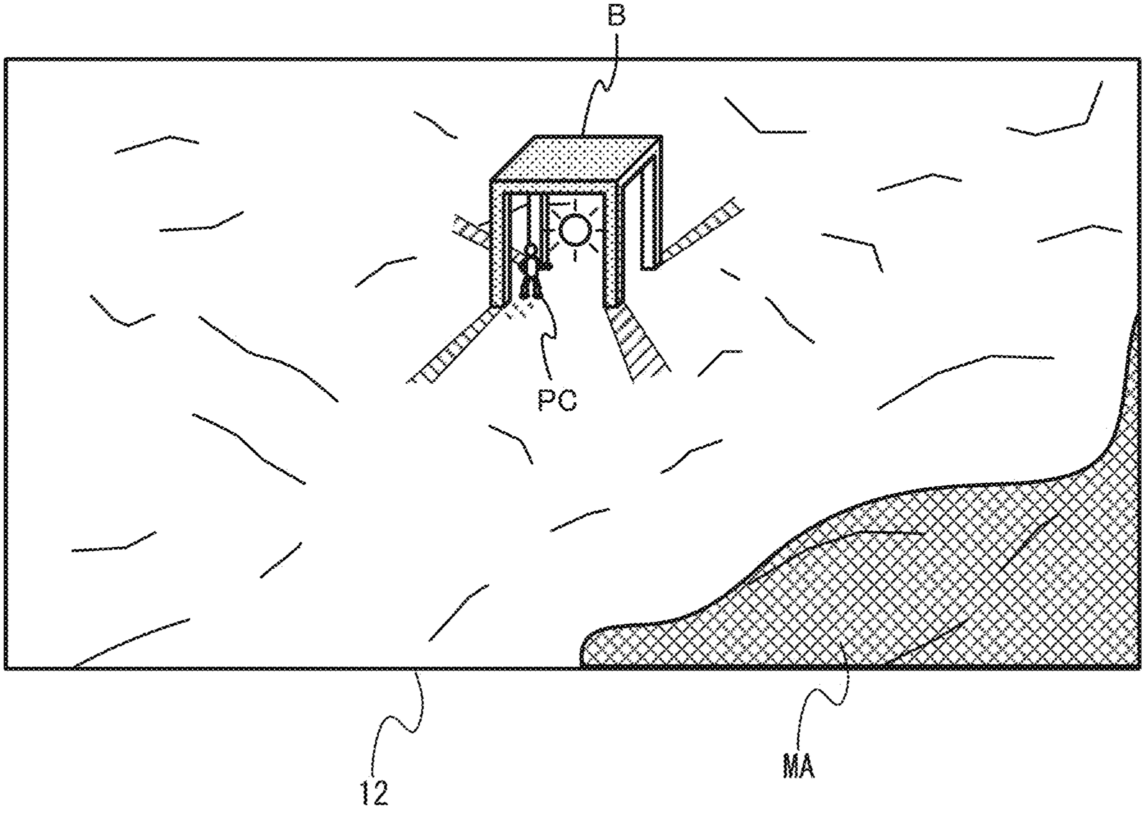
FIG. 9 is a diagram illustrating a non-limiting example of a game image showing a state in which lighting is set in a specific construction B in an underground field.
Figure 10:
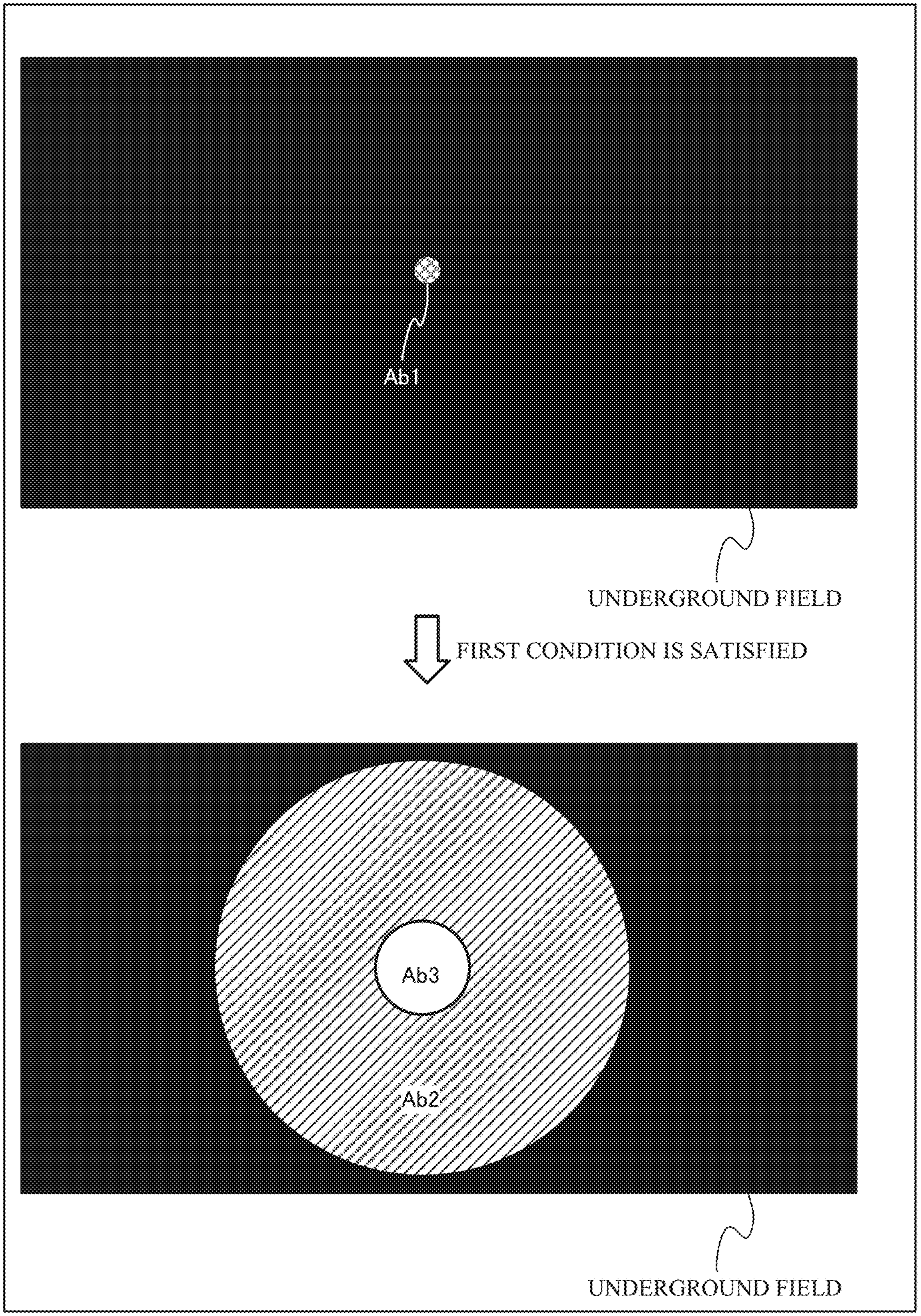
FIG. 10 is a diagram illustrating a non-limiting example of a region in which the lightness of an underground field is changed between before and after lighting is set in a specific construction B.
Figure 11:
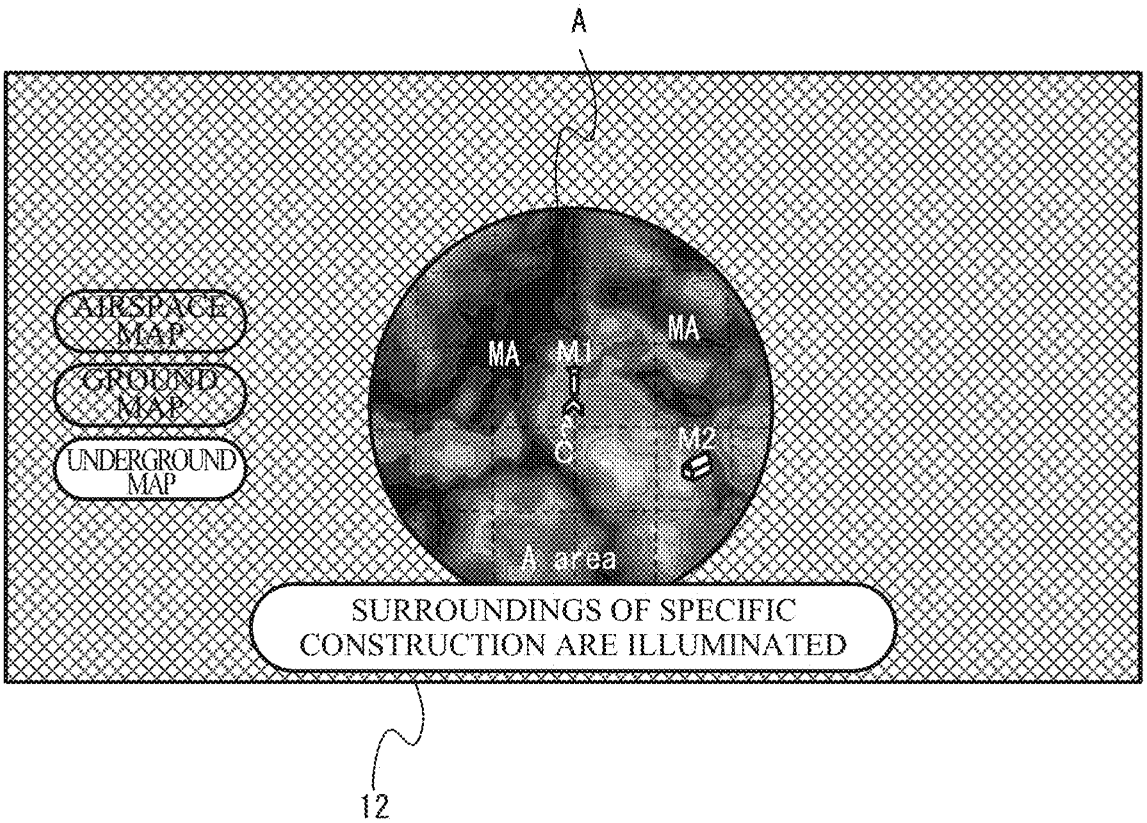
FIG. 11 is a diagram illustrating a non-limiting example of an underground map that is displayed with map information of a predetermined area unlocked.
Figure 12:
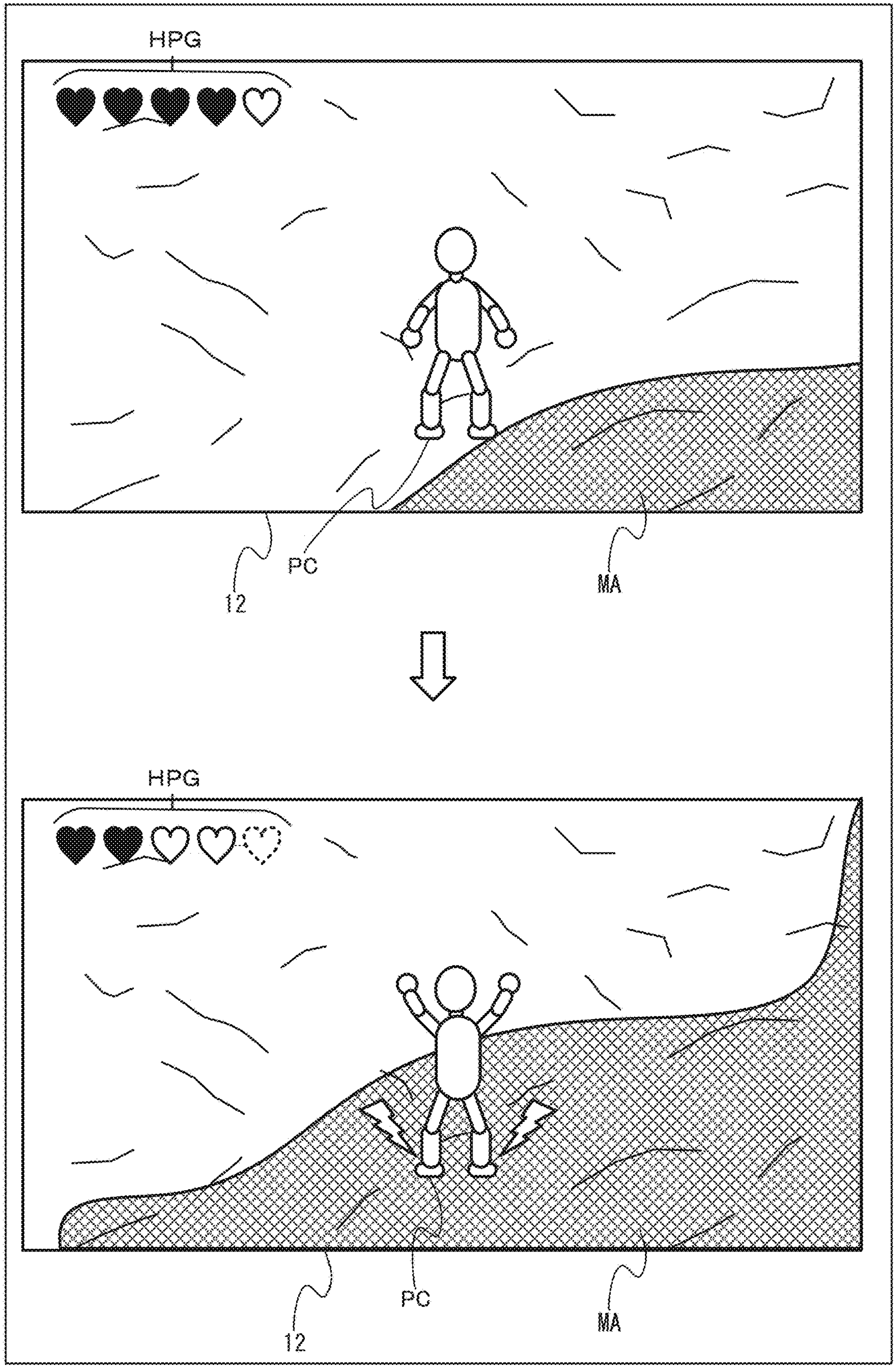
FIG. 12 is a diagram illustrating a non-limiting example of a game image that is displayed when a player character PC enters a damage area MA.

A first game process performed in the game system 1 will be outlined with reference to FIGS. 8 to 12. It should be noted that FIG. 8 is a diagram illustrating an example of a game image showing a specific construction B in an underground field when the specific construction B is in an initial state. FIG. 9 is a diagram illustrating an example of a game image showing a state in which lighting is set in the specific construction B in the underground field. FIG. 10 is a diagram illustrating an example of a region in which the lightness of the underground field is changed between before and after lighting is set in the specific construction B. FIG. 11 is a diagram illustrating an example of an underground map that is displayed with map information of a predetermined area unlocked. FIG. 12 is a diagram illustrating an example of a game image that is displayed when a player character PC enters a damage area MA.

In FIG. 8, a specific construction B is provided in an underground field in a virtual space. In the present example, for the sake of convenience, an airspace field is defined as an extent of space located higher than or equal to a predetermined height in a virtual space, a ground field is defined as a ground and an extent of space located lower than a predetermined height above the ground in the virtual space, and an underground field is defined as a space below the ground. The player character PC is allowed to move in at least a ground field in the virtual space, an underground field below the ground field, and an airspace field above the ground field, based on the user's movement operation input. It should be noted that the fields may not actually be separated in the virtual space. Although in the present example, a game image is displayed on the display 12 of the main body apparatus 2, a game image may be displayed on other display devices connected to the main body apparatus 2.

When a light source is not set in the underground field, the underground field is a dark space, in which it is difficult for the player character PC to explore. For example, in the entire virtual space, including the underground field, uniform environmental light is set for ensuring minimum lightness that allows displaying of the virtual space. In such a case, the underground field is set as a space (e.g., a dark space) having lightness lower than that provided by the environmental light set in the virtual space. As described above, in the case in which environmental light that provides uniform lightness to the entire virtual space is set, the lightness of an image for displaying the underground field is reduced (e.g., by filling with a black color) to be darker than that provided by the environmental light, so that an image for displaying to be displayed on the display 12 is generated. As an example, a frame buffer for rendering an image of the underground field as viewed from a virtual camera may be processed by applying an effect (filter) for the lightness reduction thereto.

As illustrated in FIG. 8, before lighting described below is set, the lightness of the specific construction B is set such that the user can visually recognize the specific construction B even when the underground field is dark (e.g., pitch-dark). As an example, before the lighting is set, a process of emitting weak light by a point light source or emission may be set for the specific construction B. For example, for a range that is illuminated due to the above setting, displaying in which lightness is effective due to the above setting is performed by removing filling with a black color. As a result, if there is not an obstacle between a virtual camera for generating a virtual space image and the specific construction B, the specific construction B is displayed such that the user can visually recognize the specific construction B even when the underground field is dark. In addition, the user is enabled to operate the player character PC such that the player character PC reaches the specific construction B even when the underground field is dark.

In a first example game process, when the player character PC visits the specific construction B and performs a predetermined action, lighting in the virtual space is set such that a predetermined range in the underground field including the specific construction B is lighter than before the action is performed. In addition, as described below, the specific construction B also serves as a place that the player character PC needs to visit in order to unlock map information of an underground area corresponding to the underground field in which the specific construction B is provided. In the present example, at least one specific construction B is provided in an underground field corresponding to each underground area. It should be noted that in another example, there may be an underground area in which no specific construction B is provided. When the player character PC visits the specific construction B and performs the predetermined action, the lighting is set based on the location of the specific construction B, and a series of scenes are started in which map information of an underground area corresponding to the underground field in which the specific construction B is provided. It should be noted that the player character PC's visit to the specific construction B and performance of a predetermined action corresponds to an example of the case in which the player character satisfies a first condition. The specific construction B corresponds to an example of a first type of object.

As an example, when the user's operation input for executing an "investigate" command is performed with the player character PC located in the specific construction B, the player character PC performs a predetermined action. As a result of the predetermined action performed by the player character PC in the specific construction B, lighting in the virtual space is set such that a predetermined range in the underground field including the specific construction B is lighter than the predetermined action is performed, as illustrated in FIG. 9.

The above lighting is set based on the location of the specific construction B so as to provide, in the underground field, lightness that is not extinguished over time or the like. For example, for a range in the underground field that is illuminated, displaying in which lightness is effective due to the above environmental light in that range is performed by removing filling with a black color. In addition, a light source that directly emits light from the specific construction B may be further set in the specific construction B, so that the lightness of the above range is higher than that provided by the above environmental light, or a light source may be newly set in the above range. It should be noted that any light source may be set in the specific construction B, including a point light source, a surface light source, a linear light source, a parallel light source, a spotlight, and the like. In addition, by setting the above lighting, a post-effect that is caused by emission of light (e.g., relatively bright light) which is different from that which is previously set before the above predetermined action is performed may be set in the specific construction B.

When the above predetermined action is performed, lightness around the specific construction B in the underground field is changed as illustrated in FIG. 10, as an example. FIG. 10 schematically illustrates lightness around the specific construction B before and after the above predetermined action is performed, as viewed from above a terrain field. For example, as illustrated in the upper diagram of FIG. 10, before the above predetermined action is performed, in the underground field a region (dark region) darker than the lightness provided by the uniform environmental light for ensuring minimum lightness is entirely formed, which is indicated by a portion filled with a black color in FIG. 10, and a lightness region Ab1 is formed at or near a center of that region. The lightness region Ab1 has lightness that is set such that the specific construction B can be visually recognized even when the underground field is dark, and is a small range that is lighter than the dark region over the underground field, but is relatively dark.

In addition, as illustrated in the lower diagram of FIG. 10, after the above predetermined action is performed, the above lighting is set in the underground field, so that lightness regions Ab2 and Ab3 are formed with reference to the location of the specific construction B. In the lightness region Ab2, the uniform lightness provided by the above environmental light is effectively changed based the location of the specific construction B. As an example, the lightness region Ab2 is represented by a circular region within a first distance from the specific construction B in the underground field. The lightness region Ab2 is lighter than the dark region over the underground field and the lightness region Ab1, and is larger than the lightness region Ab1.

The lightness region Ab3 is a region on which lightness acts due to setting of direct light in the specific construction B. As an example, the lightness region Ab3 is represented by a circular region within a second distance from the specific construction B in the underground field. Here, the above second distance is chosen to be shorter than the above first distance, and therefore, the lightness region Ab3 is a circular region smaller than the lightness region Ab2. In addition, the lightness region Ab3 is a region in which lightness provided by the above environmental light and lightness provided by the direct light from the specific construction B act in combination, so that the lightness of the lightness region Ab3 is higher than the lightness of the lightness region Ab2, on which only the above environmental light acts. In the lightness region Ab3, lightness gradually decreases as one moves away from the location of the light source (the location of the specific construction B).

Thus, when lighting is set in the underground field with reference to the location of the specific construction B, the range in which the user can visually recognize the underground field is enlarged, which allows the player character PC to more easily explore the underground field.

It should be noted that the shape of each of the lightness regions Ab1 to Ab3 formed in the underground field may not be circular. For example, each of the lightness regions Ab1 to Ab3 may be in the shape of an ellipse, a polygon, a rounded-corner polygon, or the like, or in any other shape. The shape or size of each of the lightness regions Ab1 to Ab3 may vary over time. For example, the range of the above shape may be reduced over time, enlarged over time, or alternately reduced and enlarged over time. In addition, the lightness of each of the lightness regions Ab1 and Ab3 may be reduced so that the region is made darker over time, or the amount of light may be increased so that the region is made lighter over time.

In addition, when there are a plurality of neighboring lightness regions based on respective specific constructions B, the lightness regions may be joined together. In such a case, the lightness of the overlapping range of two adjacent lightness regions may be set to the lightness of one of the lightness regions, or the lightness obtained by adding up the lightnesses of the two lightness regions so that the overlapping range is lighter.

In addition, in the foregoing description, as the lighting set in the virtual space based on the location of the specific construction B, the environmental light set in the virtual space and the light source set in the specific construction B are provided. The lighting may be set in other forms. For example, the above lighting may be set only by the environmental light set in the virtual space, or only by the light source (direct light) set in the specific construction B. In addition, the above lighting may be set by the environmental light set in the virtual space and light that does not depend on a light source.

In addition, in the foregoing description, lighting by the environmental light is set by removing filling with a black color in order to change the underground field into a light space, based on the location of the specific construction B. The environmental light may be made effective in other fashions. For example, in the case in which a dark space is set by avoiding setting the environmental light in at least the underground field, the above lighting may be set by setting the environmental light in a range based on the location of the specific construction B.

In the present example, when the player character PC visits the specific construction B and performs the above predetermined action, a process of unlocking map information that can be viewed by the user is also performed. Here, in the present example, all or a part of the underground field is represented by an underground map, all or a part of the ground field is represented by a ground map, and all or a part of the airspace field is represented by an airspace map.

A map showing map information of each field is divided into a plurality of areas. Each map includes, for each area, a first-state map including predetermined map information (e.g., an area map showing detailed map information) or a second-state map not including the predetermined map information (e.g., an area map not showing detailed map information). When the player character PC performs an action of unlocking map information, the map of an area where that action is performed can be changed from the second state to the first state.

For example, an underground map showing map information of the underground field is divided into a plurality of underground areas. The underground map includes, for each underground area, a first-state map including predetermined map information or a second-state map not including the predetermined map information. When the above predetermined action is performed with the player character PC located in the specific construction B, map information of an underground area corresponding to the underground field in which the specific construction B is provided is unlocked and changed from the above first state to the above second state, so that map information of the underground area can be viewed during game play. In the present example, an underground map showing predetermined map information is displayed in a region of an underground area (e.g., an A-area) corresponding to the underground field in which the specific construction B is provided, i.e., a scene notifying that the map information has been unlocked is displayed.

For example, as illustrated in FIG. 11, in the above scene indicating that map information has been unlocked, an underground map including an A-area corresponding to the underground field in which the specific construction B is provided and showing detailed map information in a region of the A-area is displayed together with information notifying that surroundings of the specific construction B are illuminated. Here, detailed map information shown in a region of an underground area due to the unlocking of map information includes terrain information such as the names, shapes, contours, and the like of seas, lakes, ponds, rivers, mountains, hills, forests, plains, and the like in the underground area, installation/construction information such as the names, shapes, locations, and the like of roads, bridges, constructions, and the like provided on the underground field corresponding to the underground area, and the like. In addition, the above map information includes information about a location and a shape of a damage area MA set in the underground field.

For example, in the example of an underground map illustrated in FIG. 11, the terrain and the damage area MA of the underground field corresponding to the A-area, and marks for constructions M1 and M2 provided in the underground field, are displayed, indicating the shape, type, location, and the like of each object. In addition, the displayed underground map shows a current location C of the player character PC in the current area. In addition, in the example of an underground map illustrated in FIG. 11, map information indicating the damage area MA is shown as a region filled with a black color.

In addition, FIG. 11 illustrates an example of an underground map including the A-area for which map information thereof has already been unlocked, and other areas for which map information thereof is locked. For example, in regions of the other areas in the above underground map, map information is locked, i.e., detailed map information such as that shown in the A-area is not shown. In the present example, for the entirety of an underground area for which map information thereof is locked, map information thereof is not shown at all, or is only partially shown. For example, even for an area for which map information thereof is locked, the names and installation/construction information of constructions and the like in the underground field that the player character PC has visited so far may be shown.

In FIG. 11, as an example, an underground area is in the shape of a circle including the location of the underground field in which a specific construction B for unlocking map information of that underground area is provided. Here, an underground area may be in the shape of a circle in which a specific construction B for unlocking map information of that underground area is centered, or a circle in which the specific construction B is not located at the center thereof. In addition, the shape of an underground area may be elliptical, polygonal, arc, calabash-shaped, or any other shape. Different underground areas may have different shapes. In addition, the shape of an underground area for which map information thereof is unlocked is different from the shape of a region that is illuminated by setting of lighting based on a specific construction B for unlocking map information of that underground area (e.g., the lightness region Ab2 illustrated in FIG. 10). In another example, these shapes may be the same.

In addition, the shape of an underground area may be deformed, depending on the map information locked/unlocked state of an adjacent underground area. As an example, when map information of two adjacent underground areas is unlocked, at least a portion of each of the two areas may be deformed such that neighboring portions of the two areas are joined together (e.g., a single calabash-shaped region is formed by the two circular regions being joined together).

In addition, the timing of unlocking map information may be either after or before lighting is set based on the specific construction B. In either case, the timing of performing a process of unlocking map information of an underground area, and the timing of displaying a scene indicating that the map information has been unlocked, may be either the same or different.

In the present example, after a scene indicating that map information of the current area has been unlocked is displayed, the action control of the player character PC based on the user's movement operation input can be resumed. As a result, after the user views unlocked map information of an underground map, the movement control of the player character PC can be resumed in the illuminated underground field, which facilitates exploration of the underground field.

In addition, during game play in which the action control of the player character PC according to the user's operation input is allowed, a map image can be displayed with any timing desired by the user. For example, during that game play, a map image for an underground map that includes an underground area corresponding to the underground field where the player character PC is located is displayed according to the user's predetermined choice operation input (e.g., a map display switching operation input of pressing the minus button 47 of the left controller 3). In addition, in the map displaying, maps to be displayed can be switched according to the user's operation input for switching maps between an underground map, a ground map, and an airspace map (e.g., a map switching operation input of pressing down the upper button 35 or the lower button 34 of the left controller 3). It should be noted that in the map displaying, an underground map, a ground map, and an airspace map are displayed with predetermined map information included in an area for which map information thereof is unlocked (e.g., detailed map information is shown), and with predetermined map information not included in an area for which map information thereof is locked (e.g., without detailed map information shown).

Next, the damage area MA set in the underground field will be described with reference to FIGS. 9 and 12. As illustrated in FIGS. 9 and 12, the damage area MA is set on a portion of a terrain object L in the underground field. When the above lighting is set in the underground field, so that the displayed terrain object L can be visually recognized, the displayed damage area MA can be distinguished from the other areas. For example, the range of the damage area MA is indicated by coloring the surface of the terrain object L with a particular color.

The player character PC is allowed to move on the terrain object L in the underground field of the virtual space, based on the user's movement operation input. The player character PC, when entering the terrain object L in which the damage area MA is set, suffers predetermined damage. For example, for the player character PC, a physical strength value (HP) is set to zero. When the physical strength value (HP) is zero, the player character PC is no longer allowed to move or act in the virtual space. When the player character PC enters the terrain object L in the damage area MA, at least one of the physical strength value and the upper limit of the physical strength value is reduced based on the duration of the entry, the number of times of the entry, or the like.

For example, the upper diagram of FIG. 12 illustrates a state before the player character PC enters the terrain object L in which the damage area MA is set, indicating that an HP gauge HPG shows that the player character PC has a physical strength value of four (i.e., a physical strength remains), where the upper limit of the physical strength value is five. In addition, the lower diagram of FIG. 12 illustrates a state after the player character PC enters the terrain object L in which the damage area MA is set, indicating that the HP gauge HPG shows that the upper limit of the physical strength value of the player character PC is reduced from five to four, and the physical strength value is reduced from four to two.

Thus, the damage area MA has a function of robbing the player character PC of its physical strength. Here, when the damage area MA is in a light state due to setting of the above lighting, the displayed damage area MA can be distinguished from the other area, and when the damage area MA is in a dark state without setting of the above lighting, it is difficult to distinguish the damage area MA from the other area. By setting the above lighting, the damage area MA can be easily avoided because the damage area MA can be distinguished by means of a game image displaying the underground field, and the location and shape of the damage area MA are included in map information of the underground map that is displayed after the map information is unlocked.

In addition, in the present example, at least one of the physical strength value and the upper limit of the physical strength value can be restored when the player character PC visits the specific construction B after the above predetermined action is performed (i.e., the above lighting is set), or when the player character PC is located in a predetermined range around the specific construction B. As an example, at least one of the player character PC's physical strength value and the upper limit of the physical strength value is restored based on the duration or the number of times of visit to the specific construction B or positioning in the above predetermined range. Therefore, by setting lighting based on the specific construction B, the player character PC's action for avoiding the damage area MA can be facilitated, and the reduced physical strength value can be restored. Thus, the setting of lighting is a key factor for exploration of the underground field.

In the present example, when the user performs an choice operation input for choosing a mark indicating a construction or the like in an unlocked area displayed in an underground map during the displaying of a map image, the player character PC can be moved automatically (i.e., without the user's movement operation input for the player character PC) from the current location in the virtual space to a location in the virtual space corresponding to the mark. For example, when the user performs, on a displayed underground map, an choice operation input for choosing a mark indicating the specific construction B, the player character PC can be moved to a location (e.g., the inside or surroundings of the specific construction B) in the virtual space corresponding to the mark by warp drive (e.g., an instantaneous movement to the corresponding location). Thus, in the present example, after unlocking of map information, the player character PC can be moved by warp drive to the inside or surroundings of the specific construction B used in unlocking of map information no matter where the player character PC is located. As a result, the physical strength value or the upper limit of the physical strength value reduced due to the damage area MA can be restored, and when the player character PC is lost during exploration of the underground field, the player character PC can return to the specific construction B by the above warp drive, and resume exploration.

In the present example, new lighting can be set by utilizing an item object contained and possessed by the player character PC. A second to a fifth example game process in which an item object possessed by the player character PC is used will be described below.

Figure 13:
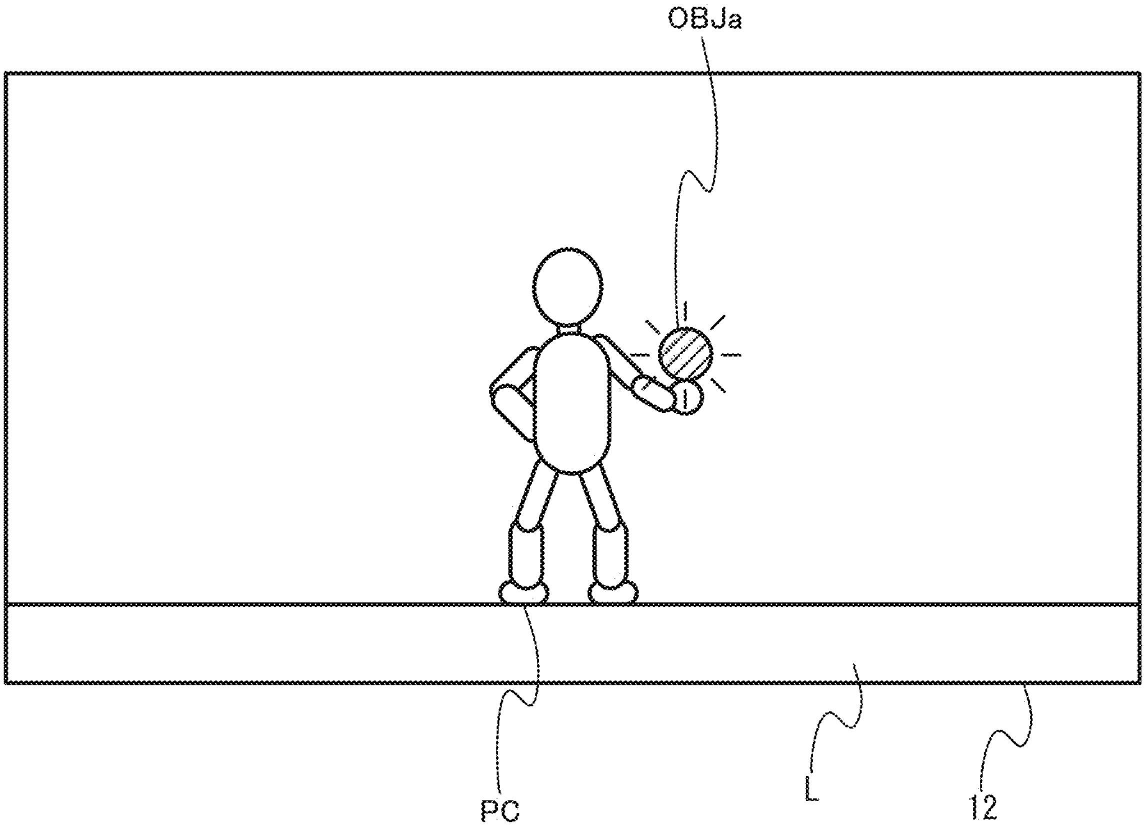
FIG. 13 is a diagram illustrating a non-limiting example of a game image of a player character PC having a first item object OBJa in a virtual space.
Figure 14:
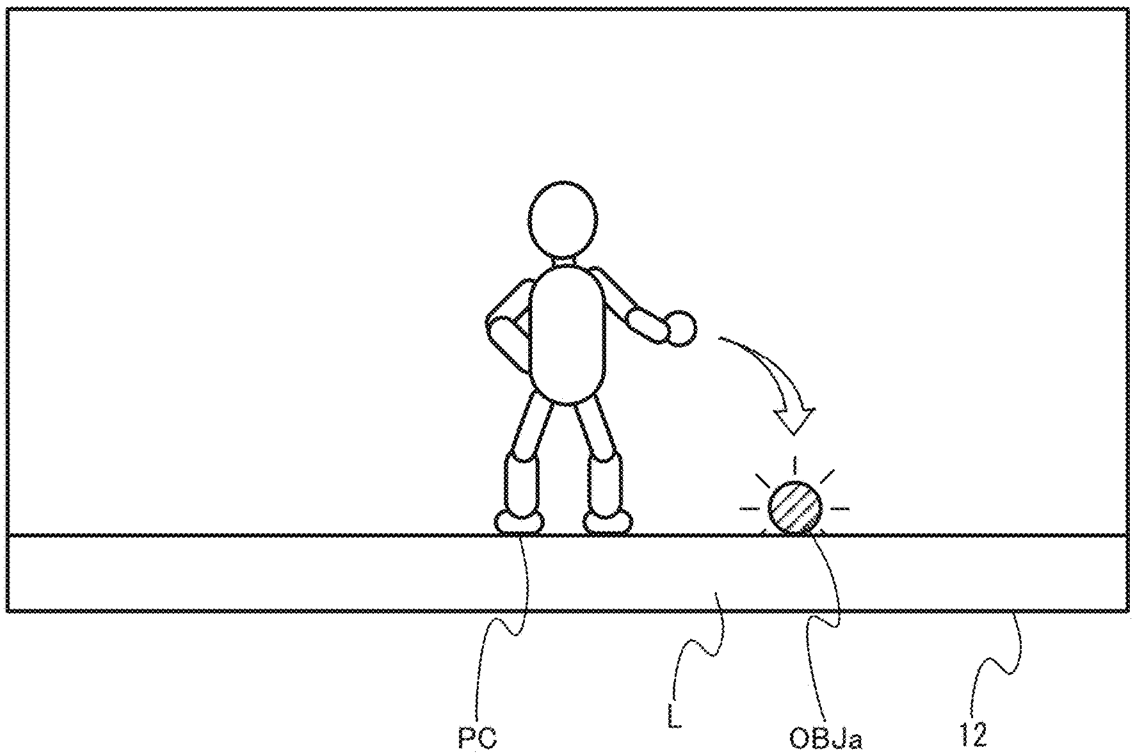
FIG. 14 is a diagram illustrating a non-limiting example of a game image showing that a first item object OBJa has dropped and is located near a player character PC's feet.
Figure 15:
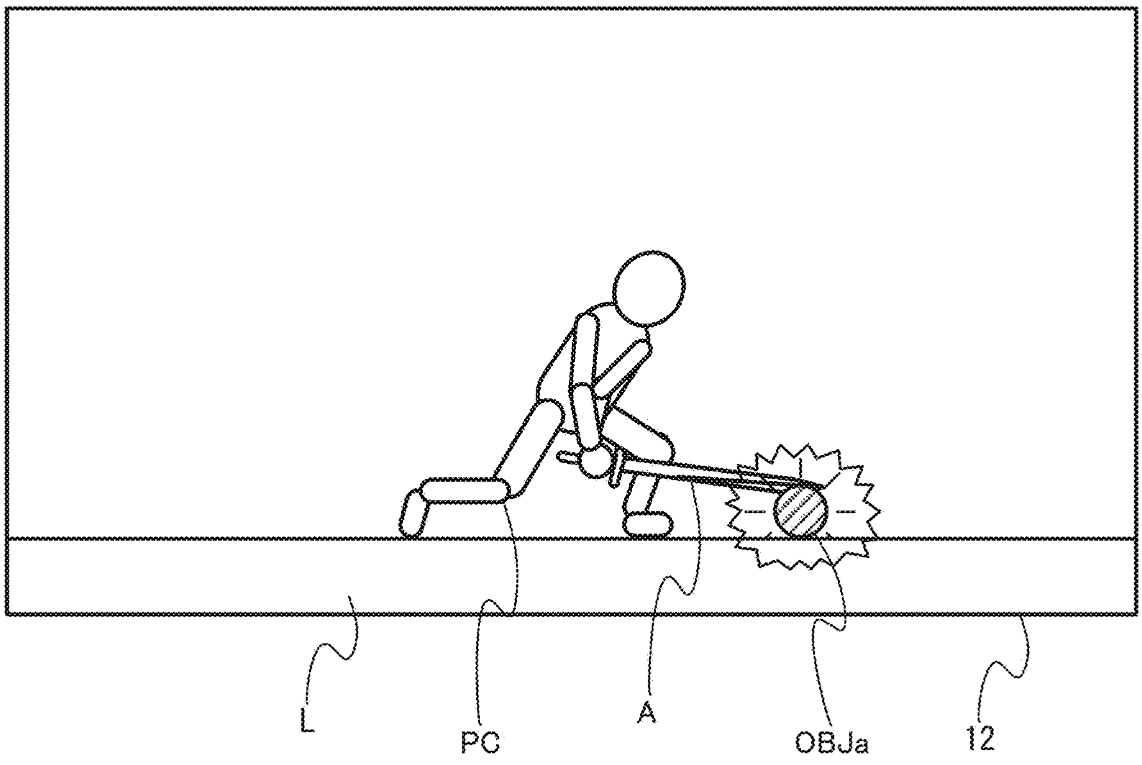
FIG. 15 is a diagram illustrating a non-limiting example of a game image showing that a player character PC is applying an impact on a first item object OBJa near the feet by a proximity attack action of swinging an equipment object A.
Figure 16:
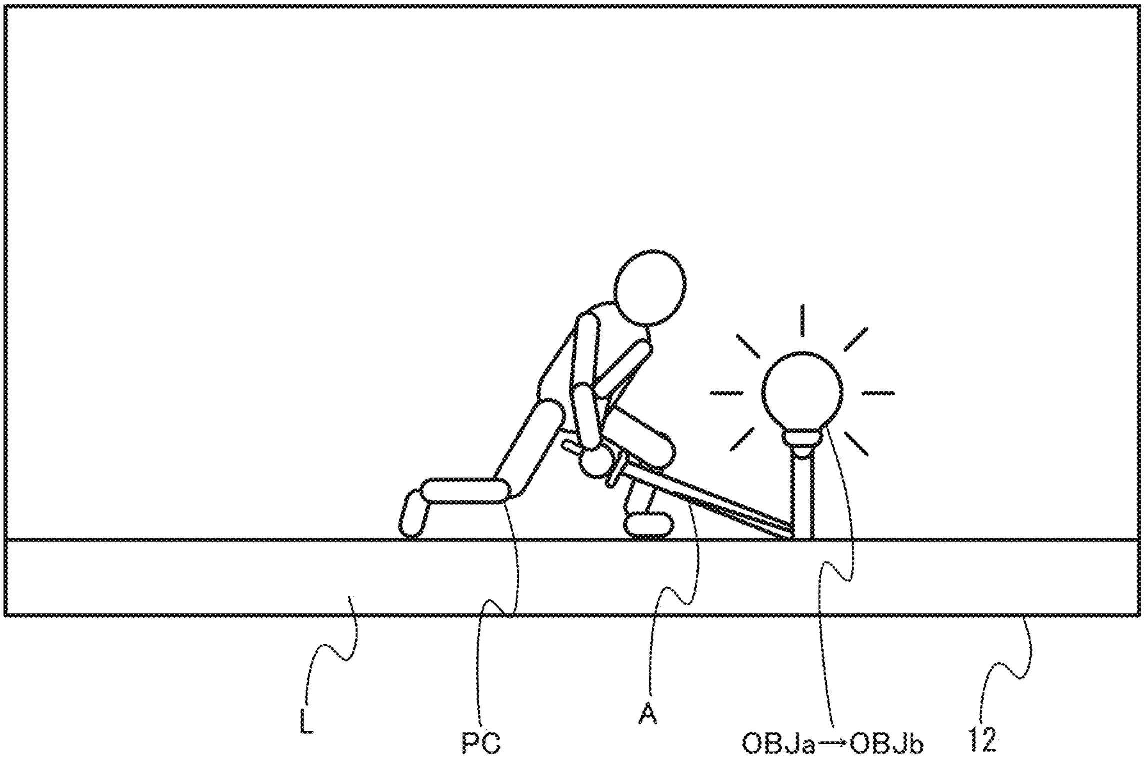
FIG. 16 is a diagram illustrating a non-limiting example of a game image showing that a second item object OBJb is installed on a terrain object by a proximity attack action of swinging an equipment object A.

A second example game process executed in the game system 1 will be outlined with reference to FIGS. 13 to 16. It should be noted that FIG. 13 is a diagram illustrating an example of a game image of a player character PC having a first item object OBJa in the virtual space. FIG. 14 is a diagram illustrating an example of a game image showing that the first item object OBJa has dropped and is located near the player character PC's feet. FIG. 15 is a diagram illustrating an example of a game image showing that the player character PC is applying an impact on the first item object OBJa near the feet by a proximity attack action of swinging an equipment object A. FIG. 16 is a diagram illustrating an example of a game image showing that a second item object OBJb is installed on the terrain object L by the proximity attack action of swinging the equipment object A.

FIG. 13 illustrates an image in which the player character PC is located in the underground field of the virtual space. It should be noted that in the figures used for describing the second to fifth example game processes, the player character PC and various virtual objects in the underground field are visible while the darkness of the underground field is not expressed, for the sake of convenience.

In FIG. 13, the player character PC is located in the underground field, holding the first item object OBJa with a hand. The first item object OBJa can be acquired on the ground field or the underground field by the player character PC performing a predetermined acquisition action (e.g., an action of picking up the first item object OBJa on a field), and can then be contained in the player character PC. Here, a state in which the player character PC contains the first item object OBJa refers to a state in which an object such as the first item object OBJa can be carried by the player character PC without the object being attached, held, or the like. At this time, the first item object OBJa may not be displayed in a game field. The contained first item object OBJa can be disposed in a game field or used (including attached or held) according to the user's operation input, basically depending on a situation. As an example, for example, the first item object OBJa is put in a pouch or an item box, so that the first item object OBJa is contained. It should be noted that such a container may not be displayed. In addition, a container such as a pouch or an item box may not exist in a game field, and instead, only the function of containing the first item object OBJa may exist.

It should be noted that the first item object OBJa may be previously disposed on a game field (terrain object L) at the start of a game. Alternatively, the first item object OBJa may be disposed as an opponent character has dropped the object or an opponent character has been beaten. The first item object OBJa may be acquired from an object that is not an item object.

The first item object OBJa may emit weak light in the underground field. For example, the first item object OBJa emits light that allows the first item object OBJa to be visually recognized even in a dark underground field, in a displayed game image. As an example, for the first item object OBJa, a post-effect of emitting light weaker than that of a point light source or emission may be set. It should be noted that in the figures for describing the second to fifth example game processes, light emission of the first item object OBJa is represented by effect lines.

In FIG. 14, the player character PC performs an action of dropping the first item object OBJa from the hand to near the feet, according to the user's action instruction. As a result, in the underground field, the first item object OBJa is disposed on the terrain object L, which forms an underground surface which the player character PC is in contact with. It should be noted that if the first item object OBJa satisfies a predetermined installation condition, the first item object OBJa is altered into a second item object OBJb, which is then installed and fixed to the terrain object L, as described below. However, in the state illustrated in FIG. 14, the above installation condition is not satisfied, and therefore, the first item object OBJa is placed without alteration on the terrain object L, which state is referred to as a non-installation state.

The player character PC is allowed to perform an action of attacking other characters and virtual objects (e.g., an opponent character) according to the user's operation. As an example, control to cause the player character PC to perform an attack action using a weapon can be performed according to the user's operation. In the present example, an equipment object, a combination equipment object, and the like are prepared as weapons that are used when the player character PC performs an attack action. The player character PC is allowed to be equipped with any of equipment objects and combination equipment objects, and is also allowed to perform an attack action using an equipment object according to the user's operation, and perform an attack action using a combination equipment object according to the user's operation.

In FIG. 15, the player character PC is holding an equipment object A that is an example of a weapon that the player character PC is allowed to be equipped with, and is performing an action of attacking the first item object OBJa placed on the terrain object L using the equipment object A. For example, when the player character PC is holding the equipment object A, the player character PC performs an action of swinging the equipment object A down according to the user's action instruction (this causes damage to an object to be attacked). When the first item object OBJa is located in a range in which the first item object OBJa is affected by the player character PC's attack action, the equipment object A hits the first item object OBJa, so that an impact is applied to the first item object OBJa.

It should be noted that the player character PC is allowed to be equipped with a plurality of equipment objects. Here, in the present example, the player character PC may be allowed to be simultaneously equipped with short-range equipment objects such as a sword object and a spear object, long-range equipment objects such as a bow and arrow object, defensive equipment objects such as a shield object, and the like. In this case, the player character PC is allowed to perform an attack action while holding one of equipment objects with which the player character PC is equipped. Specifically, according to the user's action instruction to choose an equipment object and adopt a holding position, the player character PC is caused to adopt a position to hold the chosen equipment object. In addition, according to the user's action instruction, the player character PC is caused to perform an attack action using the equipment object. It should be noted that in another example, the number of equipment objects with which the player character PC is allowed to be simultaneously equipped may be one. Although in the present example, an attack action is performed with the player character PC equipped with an equipment object, the player character PC's actions such as hitting, kicking, and gripping may be an attack action.

When it is determined that an impact has been applied to the first item object OBJa in the virtual space due to the player character PC's attack action, the first item object OBJa satisfies the installation condition. As illustrated in FIG. 16, when the first item object OBJa satisfies the installation condition, the first item object OBJa is altered into the second item object OBJb, which is then installed and fixed to the terrain object L. It should be noted that when the first item object OBJa is altered into the second item object OBJb, the first item object OBJa is removed from the virtual space, and is then no longer possessed by the player character PC.

The second item object OBJb is different from the first item object OBJa. The appearance and performance of the second item object OBJb may also be different from those of the first item object OBJa. The second item object OBJb emits light stronger than that of the first item object OBJa in the underground field. Light emitted by the second item object OBJb sets lighting such that a predetermined range of the underground field around the location where the second item object OBJb is installed is lighter than before the second item object OBJb is installed. As an example, for the second item object OBJb, a point light source or surface light source is set which emits light stronger than that of the first item object OBJa. When the second item object OBJb is installed on the terrain object L, the second item object OBJb continues to emit the above light in the installation state, and therefore, the user can recognize a state of the underground field around the installation location.

It should be noted that light emitted by the second item object OBJb may be stronger than light that is set in the specific construction B before the above predetermined action is performed, and may be weaker than light by lighting based on the specific construction B that is set after the predetermined action is performed. In addition, the range that is illuminated by the installed second item object OBJb may be smaller than the range that is illuminated by lighting based on the specific construction B that is set after the above predetermined action is performed. By setting the intensity of light in such a pattern, the second item object OBJb can be caused to play an auxiliary role as a light source for exploration until the above predetermined action is performed, which facilitates the exploration. In addition, the setting of lighting based on the specific construction B can illuminate a relatively large range in the underground field, which further facilitates exploration of the underground field.

In addition, in the case in which the range of the underground field that is to be illuminated by the first item object OBJa or the second item object OBJb has been subjected to a process of reducing light such that the range is darker than lightness provided by the environmental light set in the virtual space (e.g., a process of filling with a black color), lighting by the first item object OBJa or the second item object OBJb can be set effective by removing that process in the range that is to be illuminated. Thus, even in exploration of the underground field in which lighting is reduced compared to the other fields, the second item object OBJb, which can ensure lightness around the installation location, is allowed to be placed at any location, which facilitates exploration of the underground field using lighting by the second item object OBJb.

Figure 17:
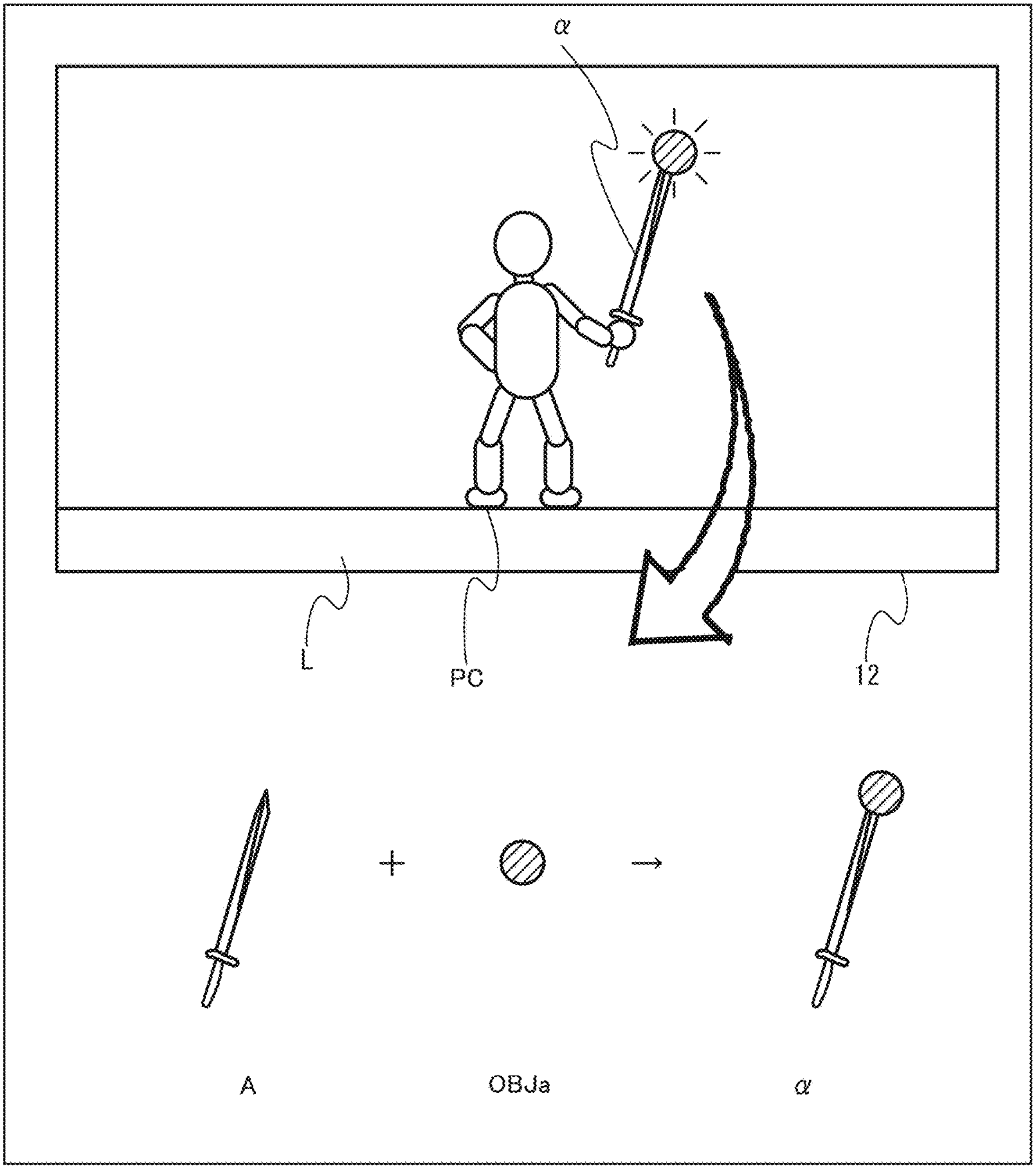
FIG. 17 is a diagram illustrating a non-limiting example of a game image showing that a player character PC synthesizes a combination equipment object α in a virtual space.
Figure 18:
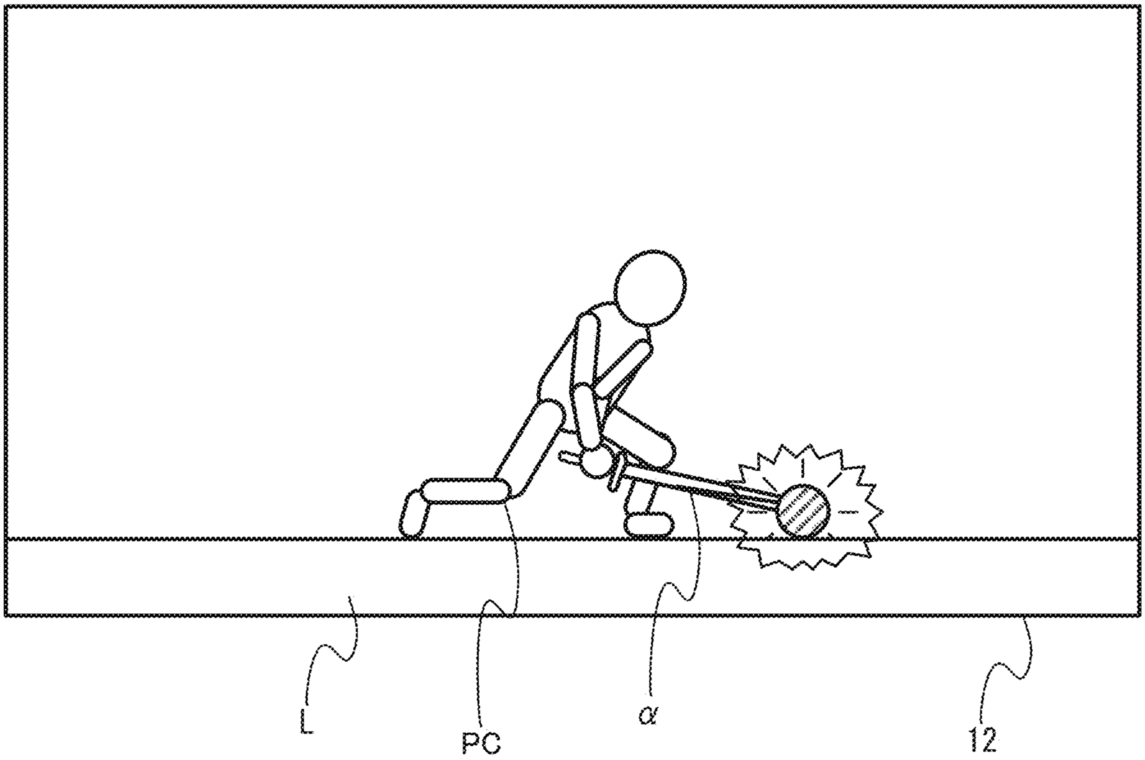
FIG. 18 is a diagram illustrating a non-limiting example of a game image showing that a player character PC is applying an impact on a first item object OBJa included in a combination equipment object α by a proximity attack action of swinging the combination equipment object α.
Figure 19:
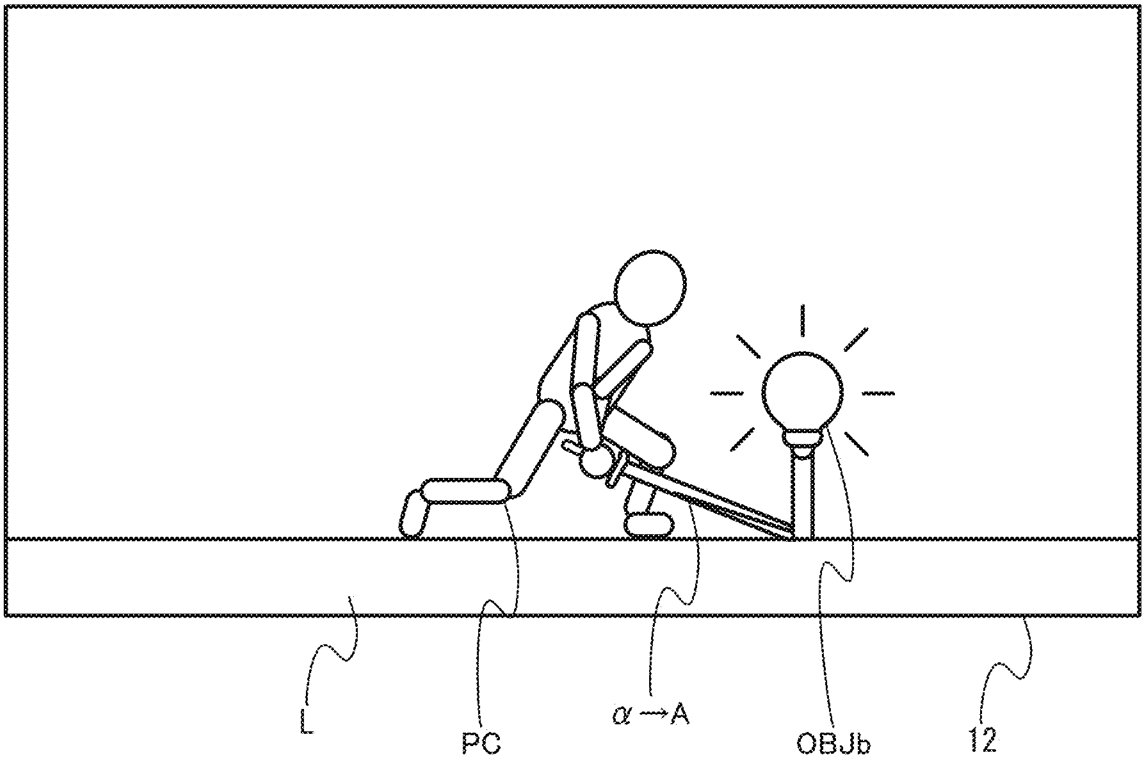
FIG. 19 is a diagram illustrating a non-limiting example of a game image showing that a second item object OBJb is installed on a terrain object due to a player character PC's proximity attack action of swinging a combination equipment object α.

A third example game process executed in the game system 1 will be outlined with reference to FIGS. 17 to 19. It should be noted that FIG. 17 is a diagram illustrating an example of a game image showing that a player character PC synthesizes a combination equipment object α in the virtual space. FIG. 18 is a diagram illustrating an example of a game image showing that the player character PC is applying an impact on a first item object OBJa included in the combination equipment object a by a proximity attack action of swinging the combination equipment object α. FIG. 19 is a diagram illustrating an example of a game image showing that a second item object OBJb is installed on the terrain object L due to the player character PC's proximity attack action of swinging the combination equipment object α.

In FIG. 17, the player character PC is holding the combination equipment object α, which is an example of a weapon with which the player character PC is equipped. The combination equipment object α is synthesized by combining an equipment object A (sword object) with the first item object OBJa. The combination equipment object α includes the first item object OBJa, which can be altered into the second item object OBJb, which emits light. Therefore, when the user causes the player character PC to perform an attack action, the combination equipment object α can exhibit a function of installing the second item object OBJb on a target object. In addition, when the user causes the player character PC to perform an attack action, the combination equipment object α exhibits a basic attack function by an attack action of swinging a sword object, i.e., "slashing another object when contacting that object". For example, when the combination equipment object α is swung, so that the blade thereof is brought into direct contact with an opponent character, the opponent character can be slashed to suffer predetermined damage.

In the present example, the combination equipment object α is synthesized by combining and integrating the equipment object A, which is possessed by the player character PC, with the first item object OBJa. For example, the user can produce the combination equipment object α by providing an item use instruction to choose the first item object OBJa as an item object to be combined with the equipment object A, and combine the first item object OBJa with the equipment object A (in other words, an instruction to integrate the equipment object A with the first item object OBJa).

As illustrated in FIG. 17, the combination equipment object α has an appearance in which the first item object OBJa is combined at a tip end portion of the equipment object A (in other words, a tip end portion of the equipment object A is replaced with the first item object OBJa, so that the equipment object A and the first item object OBJa are integrated together). Thus, in the present example, a combination equipment object (e.g., the combination equipment object α) has an appearance including at least a portion of the appearance of an equipment object (e.g., the equipment object A) that is a member of the combination equipment object, and at least a portion of the appearance of an item object (e.g., the first item object OBJa) that is a member of the combination equipment object. As a result, the combination equipment object can give the user an impression that the combination equipment object is a combination of the equipment object and the item object.

It should be noted that a portion of an equipment object at which an item object is combined may be set according to the combination of the item object and the equipment object. For example, when a shield object, which is a defensive equipment object, is combined with an item object, an appearance may be provided in which the item object is combined at a center portion or outer frame portion of the shield object.

In addition, in the example of FIG. 17, the appearance of the combination equipment object is obtained by combining the equipment object A, which is a member of the combination equipment object, with the first item object OBJa, which is a member of the combination equipment object, by replacing a portion of the appearance of the equipment object A with the entirety of the appearance of the first item object OBJa. It should be noted that the appearance of a combination equipment object may be obtained by combining the appearance of an equipment object, which is a member of the combination equipment object, with an item object, which is a member of the combination equipment object, by replacing a portion of the appearance of the equipment object with a portion of the appearance of the item object. Alternatively, the appearance of a combination equipment object may be obtained by combining the entirety of the appearance of an equipment object, which is a member of the combination equipment object, with the entirety or a portion of the appearance of an item object, which is a member of the combination equipment object.

In FIG. 18, the player character PC is performing an attack action of swinging down the combination equipment object α, which is an example of a weapon with which the player character PC is allowed to be equipped, toward the terrain object L near the player character PC's feet. When the combination equipment object α hits the terrain object L due to the player character PC's attack action, an impact is applied to the first item object OBJa, which included in the combination equipment object α, due to the attack.

When it is determined that the combination equipment object α has hit the terrain object L in the virtual space due to the player character PC's proximity attack action, so that an impact has been applied to the first item object OBJa, which is included in the combination equipment object α, the first item object OBJa satisfies the installation condition. As illustrated in FIG. 19, when the first item object OBJa, which is included in the combination equipment object α, satisfies the installation condition, the first item object OBJa is altered into the second item object OBJb, which is the installed and fixed to the site of the terrain object L hit by the combination equipment object α. The second item object OBJb, which is installed when the combination equipment object α hits the terrain object L, has the same function as that of the second item object OBJb set in the above second example game process.

Here, when the first item object OBJa, which is included in the combination equipment object α, is altered into the second item object OBJb, which is then installed on the terrain object L, the combination equipment object α is altered back into the original equipment object A. Thus, the combination equipment object α serves as a tool for installing the second item object OBJb in the underground field, and after exhibiting that function, can be used as the original equipment object A, which does not have that function.

Figure 20:
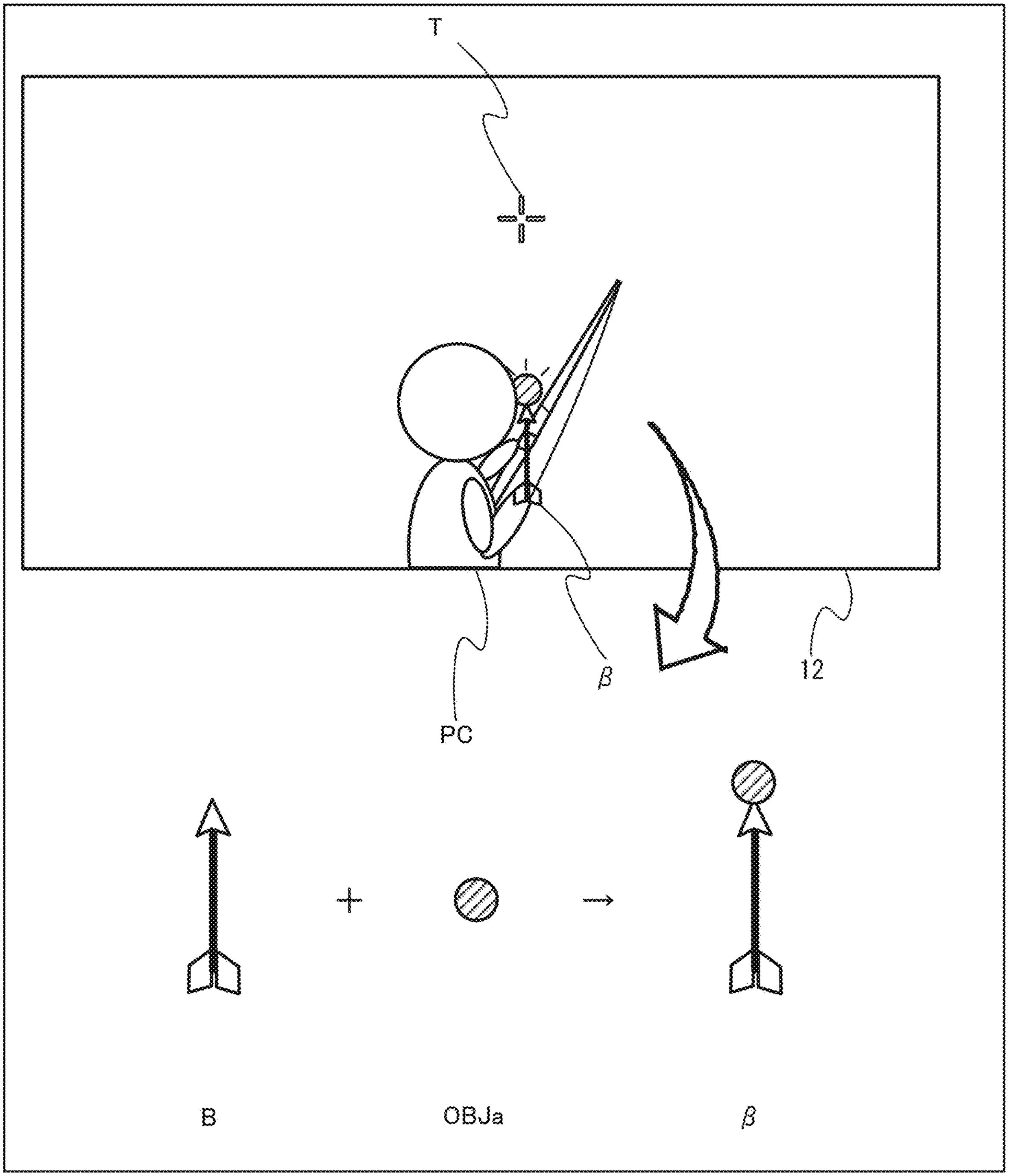
FIG. 20 is a diagram illustrating a non-limiting example of a game image showing that a player character PC performs a long-range attack action using a combination equipment object β.
Figure 21:
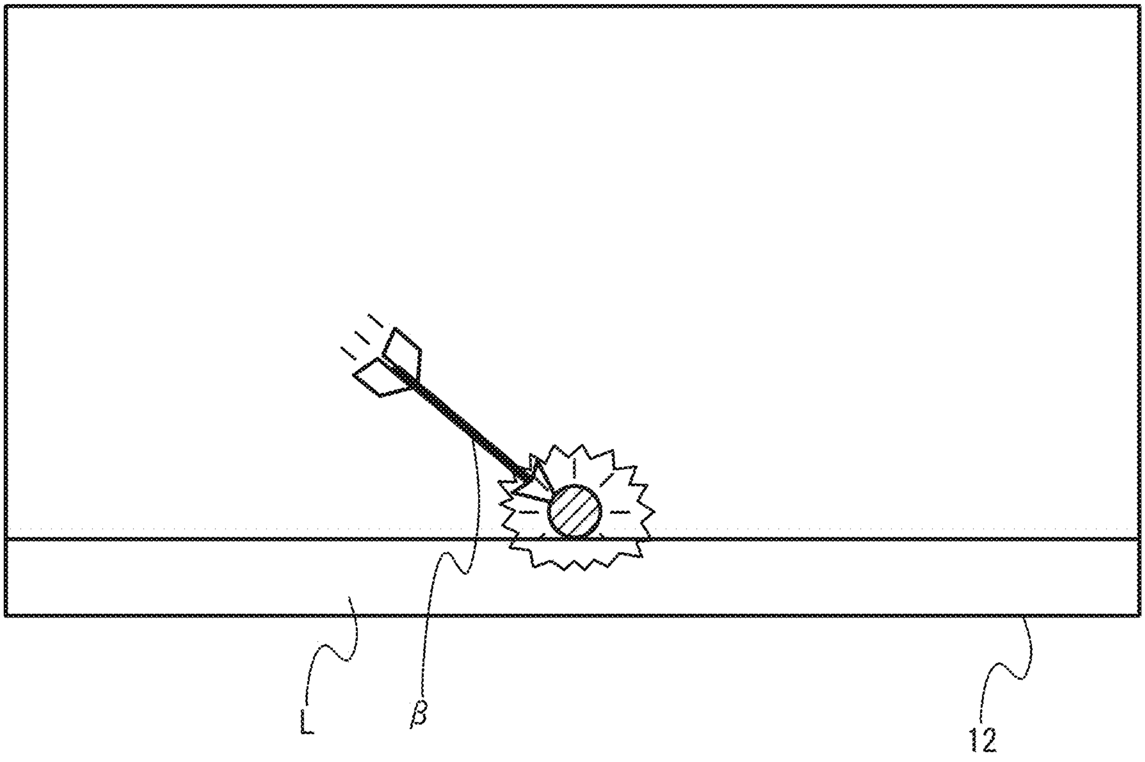
FIG. 21 is a diagram illustrating a non-limiting example of a game image showing that a combination equipment object β sticks into a terrain object, so that an impact is applied to a first item object OBJa included in the combination equipment object β.
Figure 22:
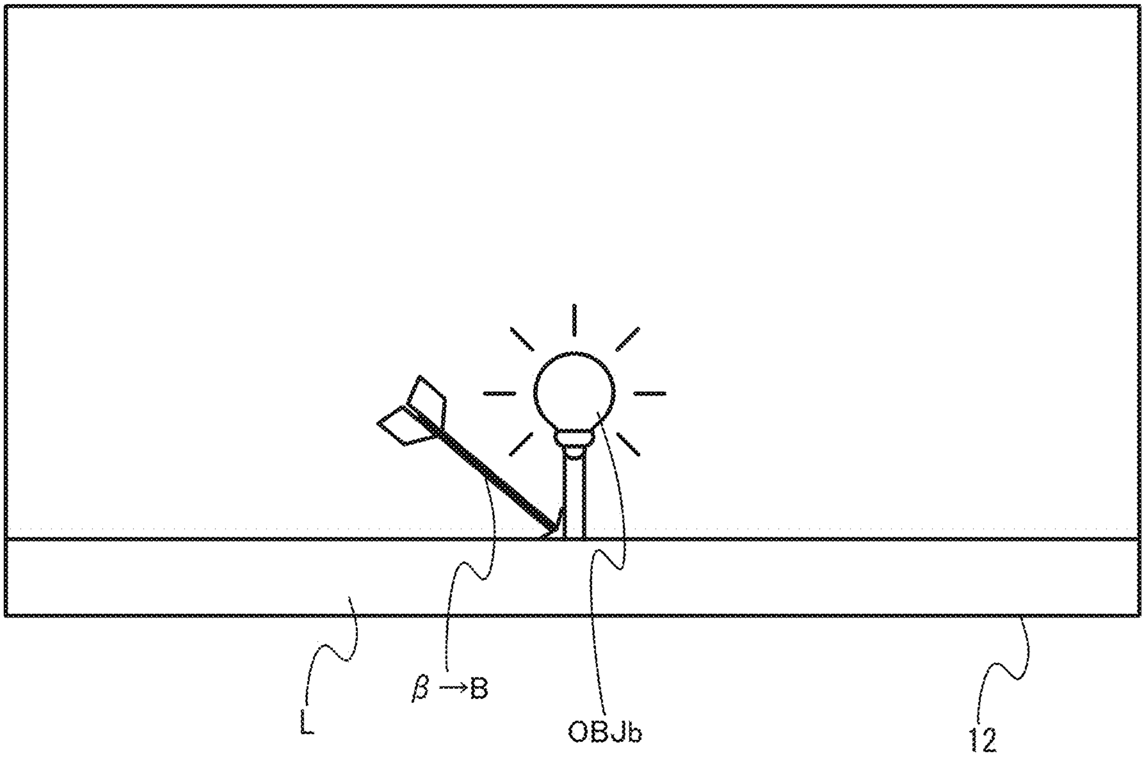
FIG. 22 is a diagram illustrating a non-limiting example of a game image showing that a second item object OBJb is installed on a terrain object due to a long-range attack action of launching a combination equipment object β.

A fourth example game process executed in the game system 1 will be outlined with reference to FIGS. 20 to 22. It should be noted that FIG. 20 is a diagram illustrating an example of a game image showing that a player character PC performs a long-range attack action using a combination equipment object β. FIG. 21 is a diagram illustrating an example of a game image showing that the combination equipment object β sticks into the terrain object L, so that an impact is applied to a first item object OBJa included in the combination equipment object β. FIG. 22 is a diagram illustrating an example of a game image showing that a second item object OBJb is installed on a terrain object L due to the long-range attack action of launching the combination equipment object β.

In FIG. 20, the player character PC is holding the combination equipment object β, which is an example of a weapon with which the player character PC is equipped. The combination equipment object β is synthesized by combining an equipment object α (a bow and arrow object; specifically, an arrow object) with the first item object OBJa. The combination equipment object β includes the first item object OBJa, which can be altered into the second item object OBJb, which emits light. Therefore, when the user causes the player character PC to perform an attack action, the combination equipment object β can exhibit a function of installing the second item object OBJb on a target object. In addition, when the user causes the player character PC to perform an attack action, the combination equipment object β exhibits a basic attack function by an attack action of launching an arrow object, i.e., "shooting an arrow object at another object". For example, when an arrow object launched using the combination equipment object β sticks into an opponent character, the opponent character can suffer predetermined damage due to the sticking.

In FIG. 20, the player character PC is holding the combination equipment object β, i.e., adopts a holding position after having made a nock in an arrow object (ready-to-shoot state). In addition, an aiming marker T is displayed which indicates a shooting direction of an arrow object that is taken when the arrow object is launched according to the user's shooting instruction. In the above ready-to-shoot state, the user is allowed to provide an instruction to change the shooting direction in addition to the above shooting instruction.

In the present example, the combination equipment object β is synthesized by combining and integrating the equipment object B, which is possessed by the player character PC, with the first item object OBJa. For example, in the above ready-to-shoot state, the user is allowed to synthesize the combination equipment object β by providing an item use instruction to combine the first item object OBJa chosen from the objects contained in the player character PC with an arrow object with which the player character PC is equipped (in other words, an instruction to integrate an arrow object included in the equipment object B with the first item object OBJa).

As illustrated in FIG. 20, the combination equipment object β has an appearance in which the first item object OBJa is combined at a tip end portion of an arrow object included in the equipment object B (in other words, a tip end portion of the arrow object is replaced with the first item object OBJa, so that the arrow object and the first item object OBJa are integrated together). Thus, in the present example, a combination equipment object (e.g., the combination equipment object β) has an appearance including at least a portion of the appearance of an equipment object (e.g., an arrow object included in the equipment object B), which is a member of the combination equipment object, and at least a portion of the appearance of an item object (e.g., the first item object OBJa), which is a member of the combination equipment object. It should be noted that when a bow and arrow object that is a long-range equipment object is combined with an item object, the resultant combination equipment object may have an appearance in which the item object is combined at the arrowhead portion, arrow nock portion, or arrow shaft portion of the arrow object included in the bow and arrow object.

In FIG. 21, the arrow object included in the combination equipment object β sticks into the terrain object L in the underground field after being launched by the player character PC's attack action. When the arrow object included in the combination equipment object β hits the terrain object L due to the player character PC's attack action, an impact is applied to the first item object OBJa, which is combined with the arrow object, due to the attack.

When it is determined that the arrow object has hit the terrain object L in the virtual space due to the player character PC's long-range attack action, so that an impact has been applied to the first item object OBJa, which is included in the combination equipment object β, the first item object OBJa satisfies the installation condition. As illustrated in FIG. 22, when the first item object OBJa, which is combined with the arrow object included in the combination equipment object β, satisfies the installation condition, the first item object OBJa is altered into the second item object OBJb, which is then installed and fixed to the site of the terrain object L hit by the arrow object. The second item object OBJb, which is installed when the allow object hits the terrain object L, has the same function as that of the second item object OBJb set in the above second example game process. Thus, by using an arrow object included in the combination equipment object β for attack, the player character PC can install the second item object OBJb at a distant location, so that a new light source is set at a target location toward which the player character PC moves, which facilitates exploration to that location.

Here, when the first item object OBJa, which is combined with the arrow object, is altered into the second item object OBJb, which is then installed on the terrain object L, the combination equipment object β is altered back into the original equipment object B (i.e., an arrow object which is a member of the equipment object B is recovered). Thus, the combination equipment object β serves as a tool for installing the second item object OBJb at a distant location in the underground field, and after exhibiting that function, can be used as the original equipment object B, which does not have that function. It should be noted that the arrow object launched in the attack action may be removed from the virtual space when the arrow object stops flying by, for example, penetrating into an object to be attacked.

It should be noted that even when an arrow object combined with the first item object OBJa has failed to penetrate (e.g., not sticking, due to being repelled or the like), the second item object OBJb may be installed at a location that the arrow object has reached.

In addition, in the above fourth example game process, an arrow object included in the combination equipment object β is launched for long-range attack, for example. The second item object OBJb may be installed according to the player character PC's attack action of launching a combination equipment object in the virtual space in other fashions. For example, a combination equipment object including the first item object OBJa (e.g., a combination equipment object obtained by combining a stick object or a sword object with the first item object OBJa) may be launched in the virtual space by the player character PC performing an attack action by throwing or kicking the combination equipment object, so that the second item object OBJb is installed. Thus, even when the player character PC launches a combination equipment object including the first item object OBJa in the virtual space in other attack fashions, the second item object OBJb may be installed at a distant location from the player character PC where the combination equipment object has hit the terrain object L.

In addition, although in the above examples, a combination equipment object in which the first item object OBJa is combined with an equipment object is used by the player character PC in an attack action, the first item object OBJa may be used alone by the player character PC in an attack action. For example, the player character PC may be allowed to perform an attack action by throwing the first item object OBJa to hit an opponent character, in which case an attack can be achieved by using the first item object OBJa alone. In that case, even in the case in which the first item object OBJa is forbidden to move at a speed exceeding a first speed described below, then if it is determined that the first item object OBJa has hit another object due to the player character PC's attack action, or that the first item object OBJa is located in a range in which the first item object OBJa is affected by the player character PC's attack action, it may be determined that the installation condition is satisfied, and therefore, the first item object OBJa is altered into the second item object OBJb, which is then installed.

In addition, in the present example, the second item object OBJb can be installed on the terrain object L, whose location cannot be changed, such as a ceiling, stone column, cliff surface, rock, tree, construction, cave, or the like. In another example, the second item object OBJb may be installed on other characters acting in the underground field and virtual objects whose locations can be changed. For example, in the case in which the second item object OBJb can be installed on other characters acting in the underground field (e.g., an opponent character), the second item object OBJb, into which the first item object OBJa has been altered, may be installed on another character by the player character PC's attack action using a combination equipment object including the first item object OBJa or the player character PC's attack action using the first item object OBJa alone. In that case, the player character PC's attack action may cause damage to an opponent character on which the second item object OBJb has been installed.

In addition, in another example, the second item object OBJb may be forbidden to be installed on other characters that perform an action in the underground field. As an example, when another character (e.g., an opponent character) that performs an action in the underground field is attacked by the player character PC's attack action using a combination equipment object including the first item object OBJa, that other character may be damaged, the second item object OBJb may not be installed on that other character, and the combination equipment object may be altered back into the original equipment object. As another example, when another character (e.g., an opponent character) that performs an action in the underground field is attacked by the player character PC's attack action using the first item object OBJa alone, that other character may be damaged, the second item object OBJb may not be installed on that other character, and the first item object OBJa may be removed.

In addition, when the first item object OBJa is located in a range in which the first item object OBJa is affected by the player character PC's attack action, and an impact is applied to the first item object OBJa, the installation condition under which the first item object OBJa is altered into the second item object OBJb, which is then installed, is satisfied. In this case, as in the above second to fourth example game processes, the first item object OBJa may be either an offensive object (the third and fourth example game processes) or a defensive object (the second example game process) in the player character PC's attack action.

Figure 23:
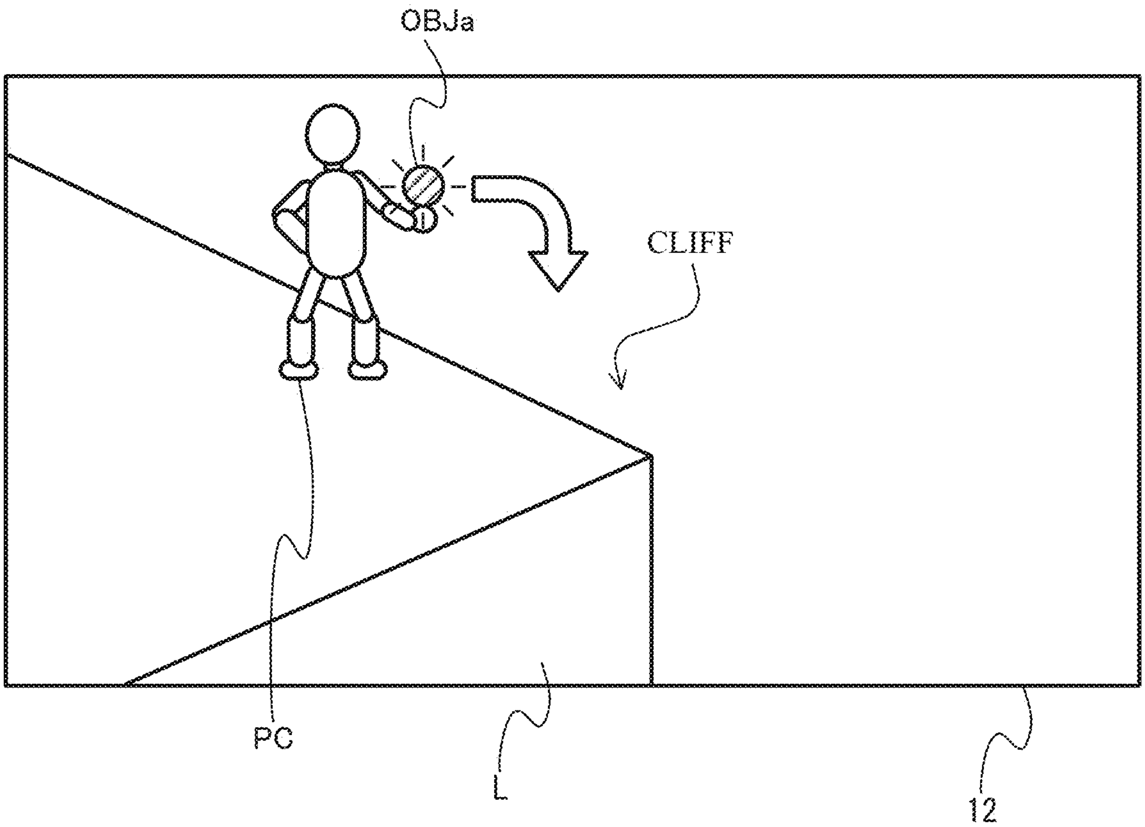
FIG. 23 is a diagram illustrating a non-limiting example of a game image showing that a player character PC drops a first item object OBJa from a cliff top.
Figure 24:
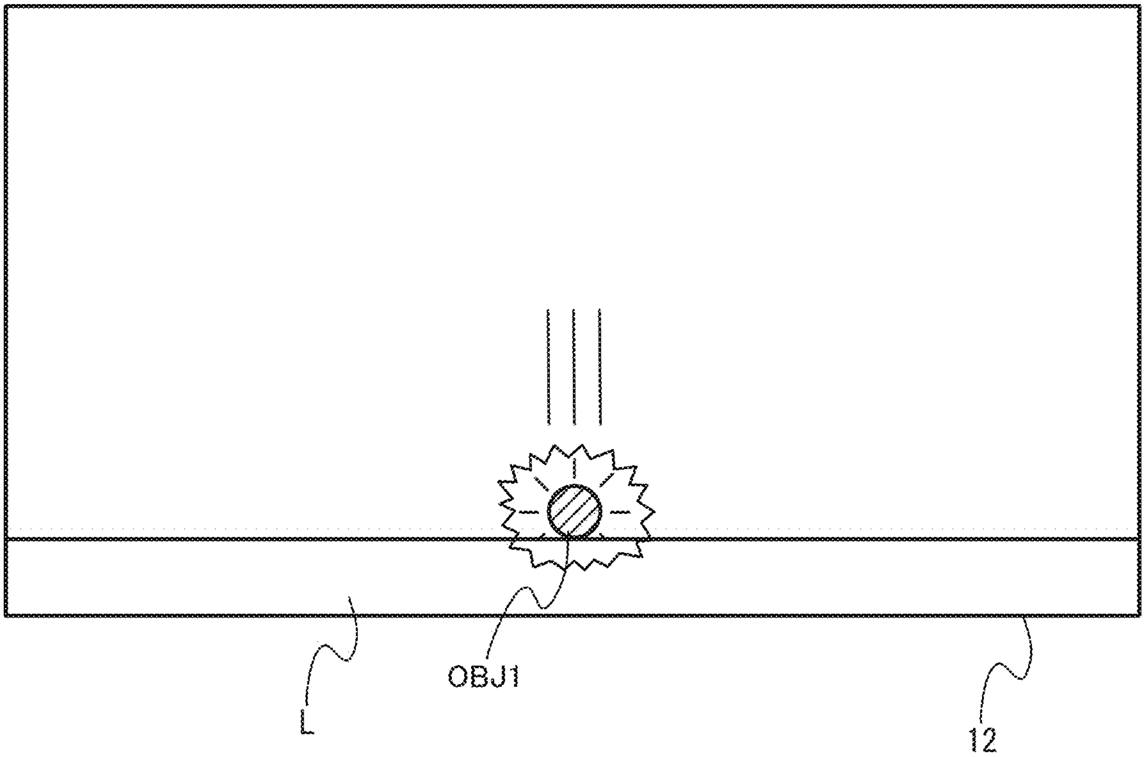
FIG. 24 is a diagram illustrating a non-limiting example of a game image showing that a first item object OBJa falls at a speed exceeding a first speed, so that an impact is applied on the first item object OBJa.
Figure 25:
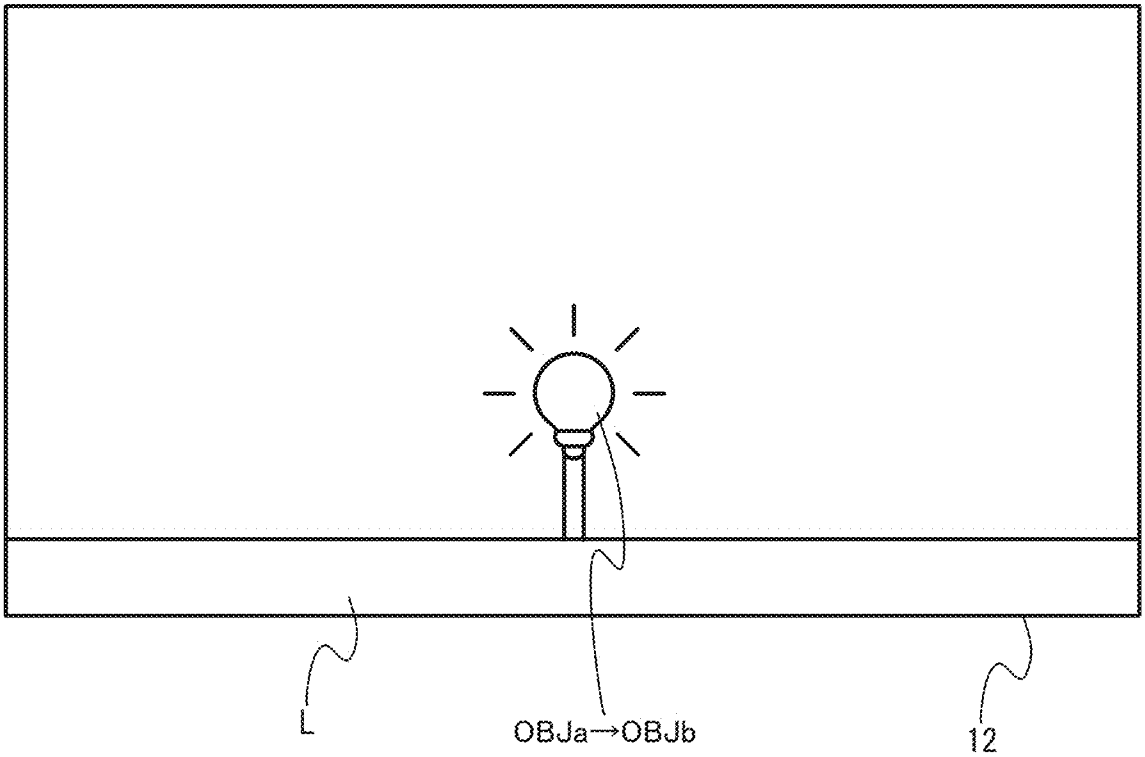
FIG. 25 is a diagram illustrating a non-limiting example of a game image showing that a first item object OBJa falls at a speed exceeding a first speed, so that a second item object OBJb is installed on a terrain object.

A fifth example game process that is executed in the game system 1 will be outlined with reference to FIGS. 23 to 25. It should be noted that FIG. 23 is a diagram illustrating an example of a game image showing that a player character PC drops a first item object OBJa from a cliff top. FIG. 24 is a diagram illustrating an example of a game image showing that the first item object OBJa falls at a speed exceeding a first speed, so that an impact is applied on the first item object OBJa. FIG. 25 is a diagram illustrating an example of a game image showing that the first item object OBJa falls at a speed exceeding a first speed, so that a second item object OBJb is installed on a terrain object L.

In FIG. 23, an image is displayed in which the player character PC holding the first item object OBJa with a hand is located on a cliff top in the underground field. The player character PC performs an action of dropping the first item object OBJa from the cliff top according to the user's action instruction. When the first item object OBJa is dropped from the cliff top, the first item object OBJa falls and moves to the bottom of the cliff at a fall speed based on virtual physical calculation (e.g., virtual inertia or gravity) or the like in the virtual space.

In FIG. 24, after dropping from the cliff top, the first item object OBJa hits the terrain object L at the bottom of the cliff at the fall speed. When the first item object OBJa hits another object (e.g., the terrain object L) at a speed exceeding the first speed in the virtual space, the first item object OBJa satisfies the installation condition.

As illustrated in FIG. 25, when the first item object OBJa satisfies the installation condition that hitting is performed at a speed exceeding the above first speed, the first item object OBJa is altered into the second item object OBJb at the hit location, and the second item object OBJb is then installed and fixed to the terrain object L. The second item object OBJb that is installed due to an impact at a speed exceeding the above first speed, has the same function as that of the second item object OBJb installed in the above second example game process. Therefore, in the fifth example game process, a dark, invisible space such as a valley floor is illuminated by dropping the first item object OBJa, so that a situation of surroundings of a terrain, an opponent character, and the like, and an item disposed on a terrain, can be recognized by the user. Thus, when the first item object OBJa hits another object at a speed exceeding the first speed in the virtual space even without the player character PC's attack action, it is determined that an impact has been applied to the first item object OBJa, so that the first item object OBJa is altered into the second item object OBJb on the terrain object L corresponding to the location where the impact has occurred.

Although in the above example, the first item object OBJa alone causes an impact at a speed exceeding the above first speed, a combination equipment object including the first item object OBJa may cause an impact at a speed exceeding the above first speed, so that the above installation condition is satisfied. For example, when the player character PC drops, from a cliff top, a combination equipment object in which an equipment object that is a stick object is combined with the first item object OBJa, then if the combination equipment object hits the terrain object L at a speed exceeding the first speed, the second item object OBJb altered from the first item object OBJa may be installed at the hit location.

In addition, although in the above example, the first item object OBJa released from the player character PC falls and moves at a speed exceeding the first speed and hits the terrain object L, so that the installation condition is satisfied, the installation condition may be satisfied in other fashions. For example, when the player character PC releases the first item object OBJa alone or a combination equipment object including the first item object OBJa in the virtual space, then if the object released by the player character PC's action hits another object at a speed exceeding the above first speed, it may be determined that the above installation condition is satisfied. For example, when the player character PC launches the first item object OBJa alone or a combination equipment object including the first item object OBJa in the virtual space using a bow object or a gun object, by throwing it, by kicking it, by causing it to roll or slide on a slope, or the like, then if the object launched by the player character PC's action hits another object at a speed exceeding the above first speed, the above installation condition may be satisfied. In that case, the above launching action may not be an action of attacking another character.

Thus, in the present example, when it is determined that an impact has been applied to the first item object OBJa in the virtual space, the installation condition is satisfied, and the first item object OBJa is altered into the second item object OBJb, which is then installed on the terrain object L of the underground field corresponding to the location where the impact has been applied, so that lighting is set such that a predetermined range around the installation location is lighter than before the installation. The above installation condition is satisfied if it is determined that an impact has been applied to the first item object OBJa when the first item object OBJa is located in a range in which the first item object OBJa is affected by the player character PC's attack action or when the first item object OBJa hits another object at a speed higher than the first speed.

It should be noted that it may be determined that the above installation condition is satisfied due to other actions. For example, when an impact is applied to the first item object OBJa by, for example, the player character PC or another character stamping the first item object OBJa, which action is different from the player character PC's attack action, or when the first item object OBJa alone or the first item object OBJa included in an equipment object hits another object in a predetermined action fashion, it may be determined that the above installation condition is satisfied.

In addition, even when the above installation condition is satisfied, the second item object OBJb may not be installed. For example, in an environment in which the second item object OBJb cannot be installed (e.g., installation is forbidden at the installation location, e.g., the installation location is made of a liquid or viscous material, the installation location is made of a material having at least a predetermined stiffness, and the installation location is a piece of equipment of the player character PC), the second item object OBJb may not be installed. In that case, the first item object OBJa may be placed in the virtual space in a non-installation state without alteration to the second item object OBJb, or may be removed from the virtual space.

In addition, as described above, when the second item object OBJb is installed on the terrain object L, the second item object OBJb continues to emit the above light in the installation state. Even when a game is interrupted, then if the game is resumed from the interrupted state, the second item object OBJb continues to emit light with the same installation location maintained. Therefore, the user can maintain the state of the underground field that has once ensured lightness can be maintained even when a game is interrupted, and therefore, can explore the underground field without re-installing the second item object OBJb on the terrain object L.

In addition, after having once been installed, second item objects OBJb may be removed from the virtual space. As a first example, an installation limitation may be put on second item objects OBJb, and when the installation limitation is exceeded, a second item object OBJb that has already been installed may be removed in an FIFO fashion. The above installation limitation may be provided by putting an upper limit on the number of second item objects OBJb installed, or putting a limit on a period of time for which a second item object OBJb has been installed. As a second example, a second item object OBJb installed on the terrain object L may be destroyed or captured by an action of another character (e.g., an opponent character) automatically controlled by the processor 81 in the virtual space to be removed. For example, in the case in which no second item objects OBJb are removed from the virtual space after having once been installed, second item objects OBJb can be installed in a dark space such as a underground field without a limit, so that it may be excessively easy to explore the field. However, when second item objects OBJb are allowed to be removed from the virtual space after having once been installed as in the above first and second examples and the like, the difficulty of a game can be adjusted.

In addition, although in the above examples, the first item object OBJa is altered into the second item object OBJb, the first item object OBJa may be installed on the terrain object L without alteration. In that case, when it is determined that an impact has been applied to the first item object OBJa, so that the installation condition is satisfied, the first item object OBJa is installed, without alteration, on the terrain object L corresponding to the impact-applied location, so that lighting is set in the virtual space such that a predetermined range around the location where the first item object OBJa is installed is lighter than before the installation.

Figure 26:
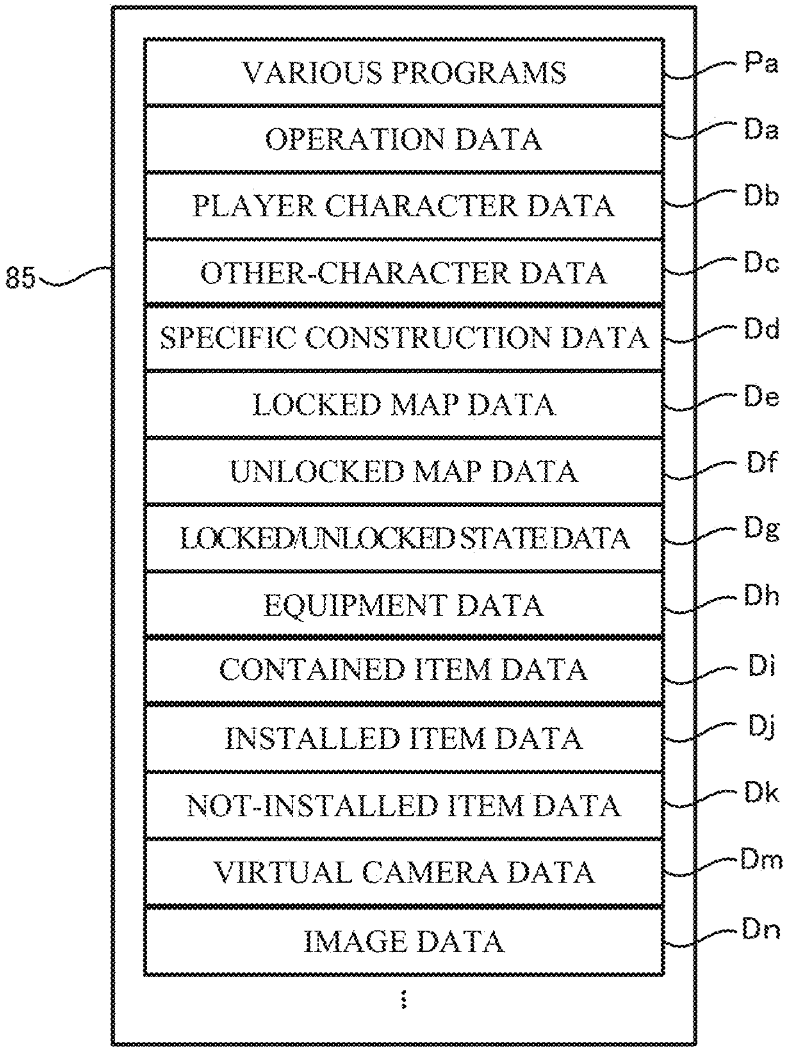
FIG. 26 is a diagram illustrating a non-limiting example of a data area set in a DRAM 85 of a main body apparatus 2.

Next, a specific example of a process executed in the game system 1 will be described with reference to FIG. 26. FIG. 26 is a diagram illustrating an example of a data area set in the DRAM 85 of the main body apparatus 2. It should be noted that the DRAM 85 also stores data used in other processes in addition to the data of FIG. 26, and those data will not be described in detail.

Various programs Pa that are executed in the game system 1 are stored in a program storage area of the DRAM 85. In the present example, the programs Pa include an application program (e.g., a game program) for performing information processing based on data obtained from the left controller 3 and/or the right controller 4, and the main body apparatus 2. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

Various kinds of data that are used in processes such as an information process that are executed in the game system 1 are stored in a data storage area of the DRAM 85. In the present example, the DRAM 85 stores operation data Da, player character data Db, other-character data Dc, specific construction data Dd, locked map data De, unlocked map data Df, locked/unlocked state data Dg, equipment data Dh, contained item data Di, installed item data Dj, not-installed item data Dk, virtual camera data Dm, unlocking scene flag data Dn, map display flag data Do, image data Dp, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, or a touch panel) (specifically, information about an operation). In the present example, operation data is obtained from each of the left controller 3 and/or the right controller 4 and the main body apparatus 2. The obtained operation data is used to update the operation data Da as appropriate. Note that the operation data Da may be updated for each frame that is the cycle of a process executed in the game system 1, or may be updated each time operation data is obtained.

The player character data Db indicates the place, direction, position, action, state, physical strength value, physical strength value upper limit, and the like of a player character PC disposed in the virtual space. The other-character data Dc indicates the places, directions, and positions, actions, states, and the like of other characters disposed in the virtual space.

The specific construction data Dd indicates the location, state, and lighting setting of each specific construction provided in an underground field.

The locked map data De indicates, for each area, maps (an underground map, a ground map, and an airspace map) for which map information thereof is locked. The unlocked map data Df indicates, for each area, maps for which map information thereof is unlocked.

The locked/unlocked state data Dg indicates whether map information of each area in an underground field, a ground field, and an airspace field is locked or unlocked.

The equipment data Dh indicates an equipment object(s) and a combination equipment object(s) with which the player character PC is currently equipped, and which of these equipment objects and combination equipment objects is currently used by the player character PC (in a holding position).

The contained item data Di indicates the types and number of item objects contained in the player character PC.

The installed item data Dj indicates the location, type, and lighting setting of an item object installed on a game field (terrain object L). The not-installed item data Dk indicates the location, type, and lighting setting of each item object placed on a game field (terrain object L) in a non-installation state.

The virtual camera data Dm indicates the location, direction, angle of view, and the like of a virtual camera disposed in the virtual space.

The image data Dn is used to display, on a display screen (e.g., the display 12 of the main body apparatus 2), images (e.g., an image of the player character PC, images of other characters, images of objects such as equipment objects and item objects, an image of a field in the virtual space, and a background image).

Figure 27:
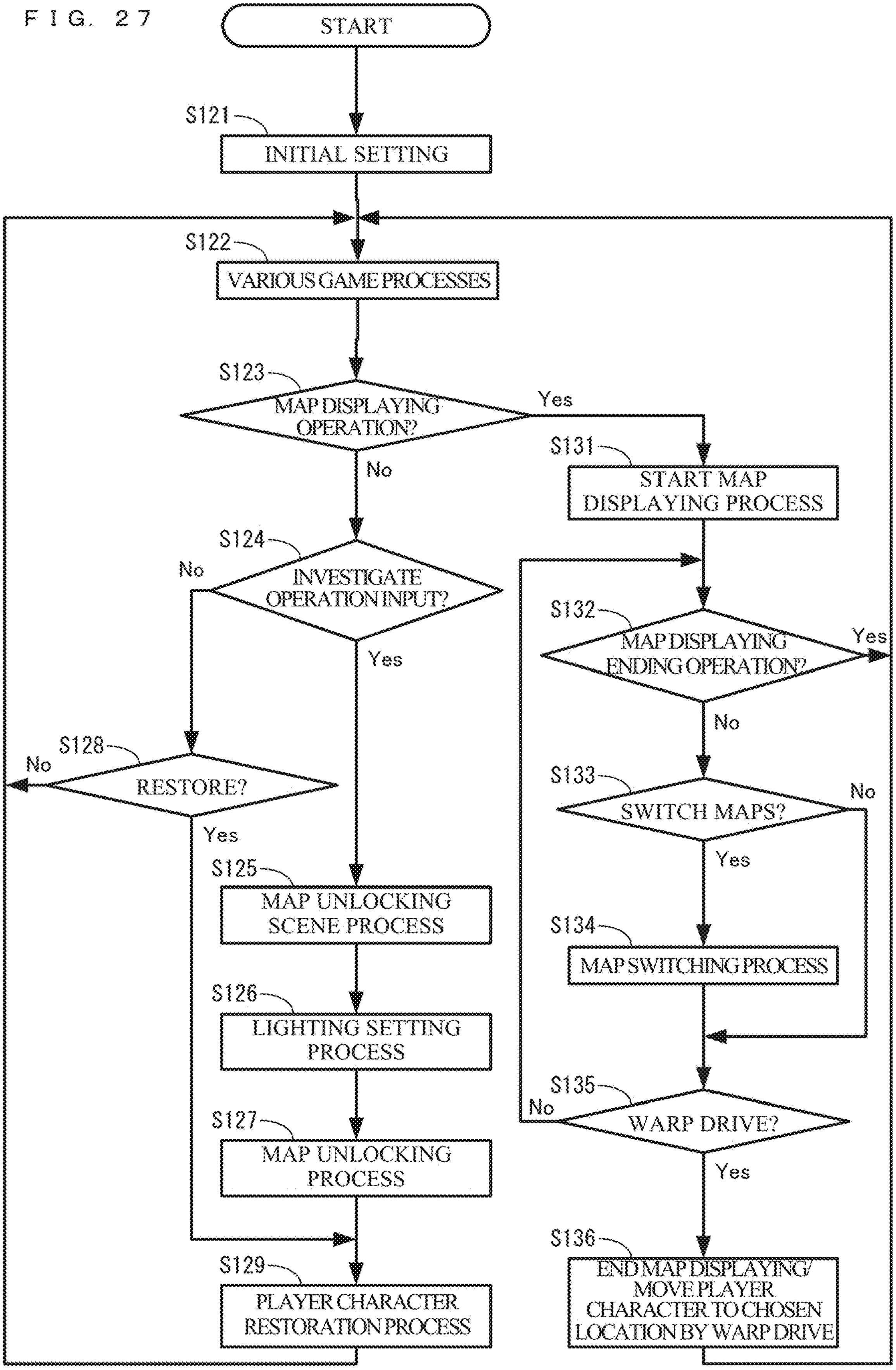
FIG. 27 is a flowchart illustrating a non-limiting example of a game process executed in a game system 1.
Figure 28:
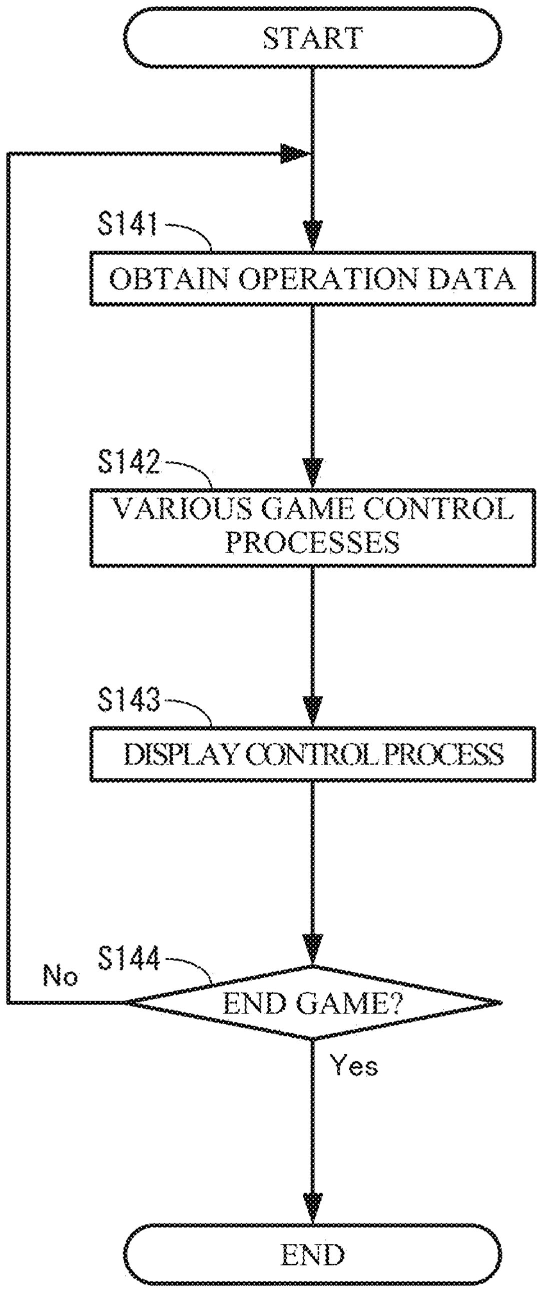
FIG. 28 is a flowchart illustrating a non-limiting example of a process on a frame-by-frame basis in each game process illustrated in step S122 of FIG. 27.
Figure 29:
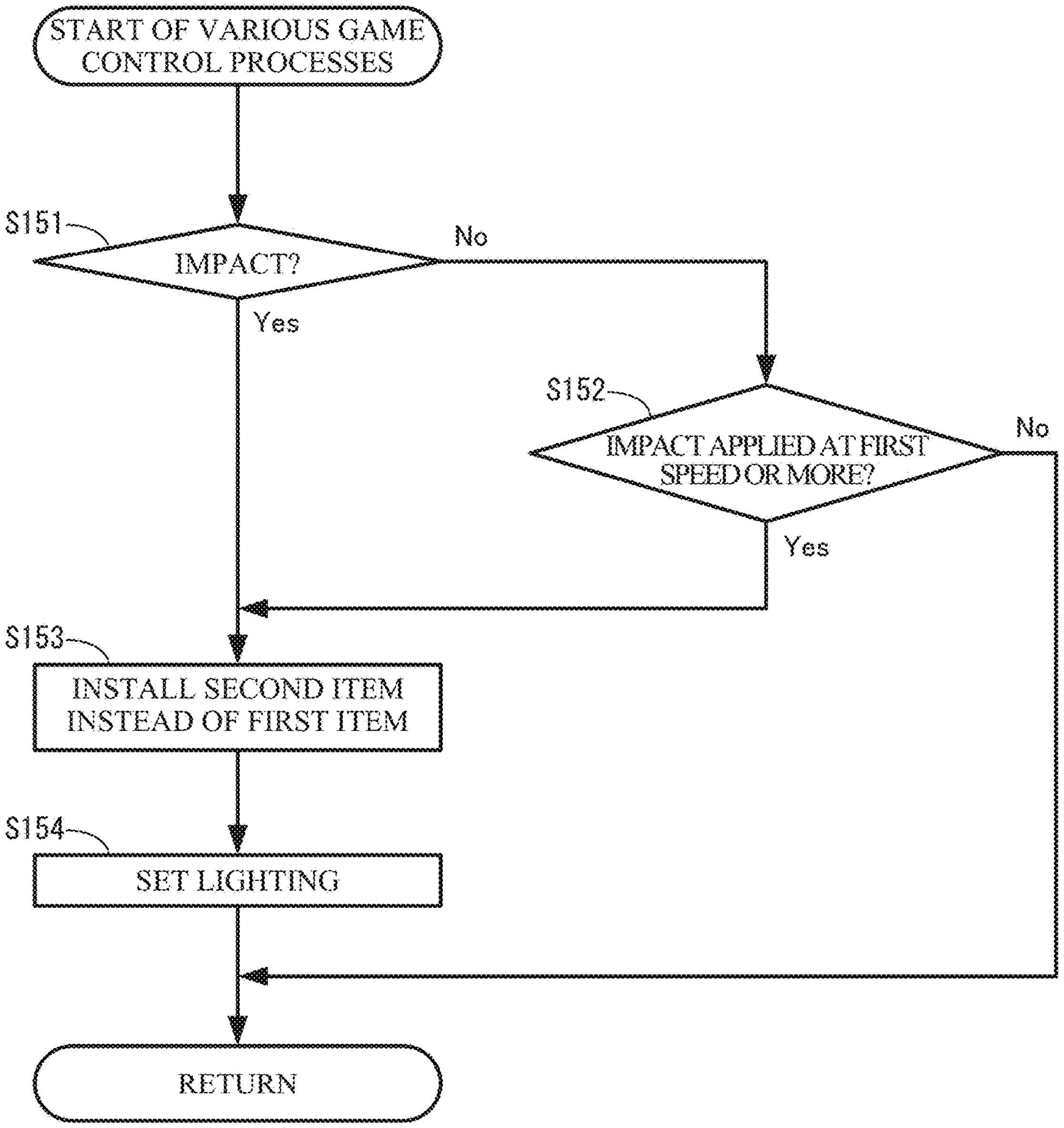
FIG. 29 is a flowchart illustrating a non-limiting example item object installation process that is an example of various game control processes in step S142 of FIG. 28.
Figure 30:
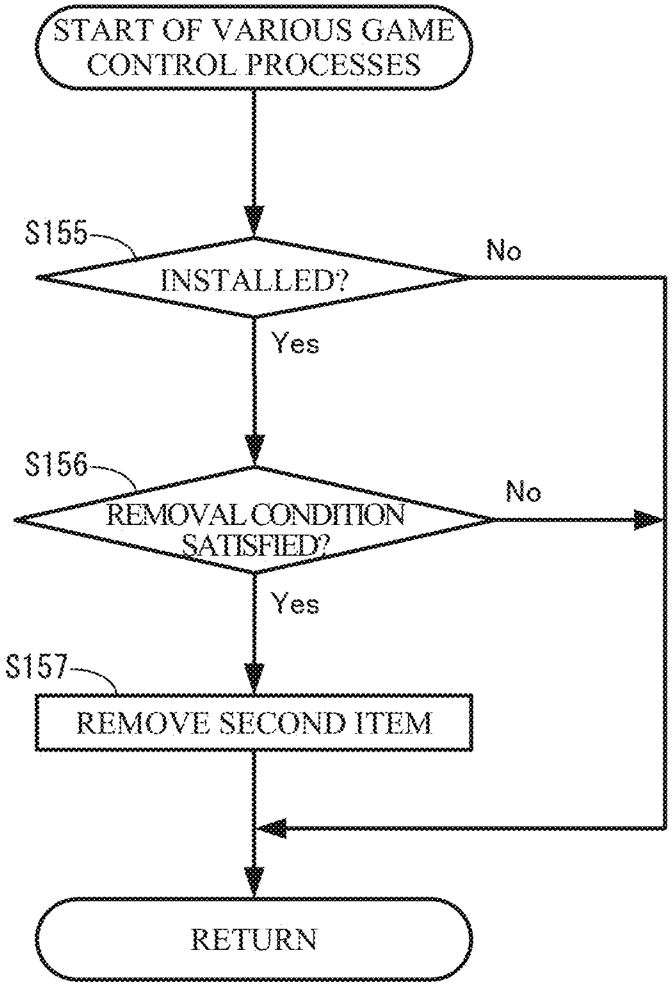
FIG. 30 is a flowchart illustrating a non-limiting example item object removal process that is another example of various game control processes in step S142 of FIG. 28.

Next, a detailed example of a game process that is an example of an information process of the present example will be described with reference to FIGS. 27 to 30. FIG. 27 is a flowchart illustrating an example of a game process executed in the game system 1. FIG. 28 is a flowchart illustrating an example of a process on a frame-by-frame basis in each game process illustrated in step S122 of FIG. 27. FIG. 29 is a flowchart illustrating an example item object installation process that is an example of various game control processes in step S142 of FIG. 28. FIG. 30 is a flowchart illustrating an example item object removal process that is another example of various game control processes in step S142 of FIG. 28. In the present example, a series of steps illustrated in FIGS. 27 to 30 are executed by the processor 81 executing a predetermined application program (game program) included the programs Pa. The game processes of FIGS. 27 to 30 are started with any appropriate timing. A flow of the game process is described with reference to FIG. 27 below. During execution of a game process or the like, operation data is obtained for each frame (i.e., at predetermined time intervals), and the operation data Da is updated, each object in the virtual space is controlled, an image is displayed, and the like. The flowchart of FIG. 28 illustrates various game processes as examples of a frame-by-frame process.

It should be noted that the steps in the flowchart of FIGS. 27 to 30, which are merely illustrative, may be executed in a different order, or another step may be executed in addition to (or instead of) each step, if a similar effect is obtained. In the present example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 27 to 30 may be executed by a plurality of information processing apparatuses including the main body apparatus 2 cooperating with each other.

In FIG. 27, the processor 81 performs initial setting for the game process (step S121), and proceeds to the next step. For example, in the initial setting, the processor 81 initializes parameters for performing steps described below, and updates each data. As an example, the processor 81 disposes a player character PC, other characters, a virtual camera, and the like in predetermined positions at default locations in the virtual space, which is in the initial state, and updates the player character data Db, the other-character data Dc, and the virtual camera data Dm. In addition, the processor 81 updates the specific construction data Dd, the installed item data Dj, and the not-installed item data Dk, depending on a situation including lighting setting of a specific construction and an item object in a game field (e.g., a specific construction and an item object provided in a game field are set to default states when a game is first started (e.g., the lightness of a specific construction B is set such that the specific construction B can be visually recognized in an underground field), and when the game is resumed from a halfway point, the game is set, based on saved data or the like, to a state that had occurred before the game was interrupted). In addition, the processor 81 updates the locked/unlocked state data Dn, depending on the locked/unlocked state of map information of each area in an underground field, a ground field, and an airspace field in the virtual space (e.g., all areas are set locked when a game is first started, and when the game is resumed from a halfway point, map information of each area is set, based on saved data or the like, to the locked/unlocked state that had occurred before the game was interrupted).

Next, the processor 81 performs various game processes (step S122), and proceeds to the next step. Specific examples of the various game processes in step S122 will be described below.

Next, the processor 81 determines whether or not to perform map displaying control (step S123). For example, if the operation data Da indicates the user's operation input for starting map displaying control (e.g., a map display switching operation input of pressing down the minus button 47 of the left controller 3), the result of the determination by the processor 81 in step S123 is positive. If the processor 81 determines not to perform map displaying control, the processor 81 proceeds to step S124. Otherwise, i.e., if the processor 81 determines to perform map displaying control, the processor 81 proceeds to step S131.

Next, the processor 81 determines whether or not the user's operation input for choosing the "investigate" command has been performed (step S124). For example, if the operation data Da indicates the user's operation input for causing the player character PC to set lighting in a specific construction B and unlock map information (e.g., the user's operation input for choosing the "investigate" command in a specific construction B), the result of the determination by the processor 81 in step S124 is positive. If the user's operation input for choosing the "investigate" command has been performed, the processor 81 proceeds to step S125. Otherwise, i.e., if the user's operation input for choosing the "investigate" command has not been performed, the processor 81 proceeds to step S128.

In step S125, the processor 81 performs a map unlocking scene process, and proceeds to the next step. For example, the processor 81 displays a map unlocking scene notifying that map information of an underground area corresponding to the underground field in which a specific construction B which is currently visited by the player character PC is provided has been unlocked. As an example, as described with reference to FIG. 11, the processor 81 starts an animation process for displaying a scene indicating that an underground map showing detailed map information is displayed in a region of an underground area corresponding to the underground field in which a specific construction B which is currently visited by the player character PC is provided. The processor 81 displays a map unlocking scene by continuously processing animation for displaying a scene that displays an underground map of an underground area for which map information thereof has been unlocked, and thereby notifies that the unlocking has been performed, on a frame-by-frame basis.

Next, the processor 81 sets lighting based on the specific construction B (step S126), and proceeds to the next step. For example, the processor 81 removes filling with a black color for a range (e.g., the lightness range Ab2 of FIG. 10) in which the underground field is illuminated based on the location of the specific construction B which is currently visited by the player character PC, whereby lightness provided by environmental light is effective in the range, and a light source that emits direct light is set in the specific construction B, and updates the specific construction data Dd.

Next, the processor 81 executes a map unlocking process (step S127), and proceeds to step S129. For example, the processor 81 sets the locked/unlocked state of map information of a current area corresponding to the field in which the player character PC is located, to the unlocked state, and updates the locked/unlocked state data Dg.

Meanwhile, in step S128, the processor 81 determines whether or not to restore the physical strength value of the player character PC and the upper limit of the physical strength value. For example, if the player character PC is located in the specific construction B for which map information thereof has been unlocked (i.e., the specific construction B for which lighting has been set by the above predetermined action) or in a predetermined range around the specific construction B, the result of the determination by the processor 81 in step S128. If the processor 81 determines to restore the physical strength value of the player character PC and the upper limit of the physical strength value, the processor 81 proceeds to step S129. Otherwise, i.e., if the processor 81 determines not to restore the physical strength value of the player character PC and the upper limit of the physical strength value, the processor 81 returns to and repeats step S122.

In step S129, the processor 81 restores the physical strength value of the player character PC and/or the upper limit of the physical strength value by a predetermined amount, and returns to and repeats step S122. For example, the processor 81 restores the physical strength value of the player character PC and/or the upper limit of the physical strength value by a predetermined amount, based on the duration or number of times the player character PC is located in the specific construction B or the above predetermined range, and updates the player character data Db.

Meanwhile, if, in step S123, the processor 81 determines to perform map displaying control, the processor 81 executes a map displaying process (step S131), and proceeds to the next step. For example, the processor 81 performs control to display, on the display 12, a map including an area corresponding to the field where the player character PC is located.

As a first example, a map image to be displayed is generated by assigning each unlocked underground area indicated by the locked/unlocked state data Dg an unlocked underground map image of that underground area indicated by the unlocked map data Df, assigning each locked underground area indicated by the locked/unlocked state data Dg a locked underground map image of that underground area indicated by the locked map data De, and combining the map images of the underground areas. Thereafter, a label indicating the current location C is put on top of the map image, based on the location of the player character PC indicated by the player character data Db, and displaying of the map image on the display 12 is controlled.

As a second example, a map image to be displayed is generated by assigning each unlocked ground area indicated by the locked/unlocked state data Dg an unlocked ground map image of that ground area indicated by the unlocked map data Df, assigning each locked ground area indicated by the locked/unlocked state data Dg a locked ground map image of that ground area indicated by the locked map data De, and combining the map images of the ground areas. Thereafter, a label indicating the current location C is put on top of the map image, based on the location of the player character PC indicated by the player character data Db, and displaying of the map image on the display 12 is controlled.

As a third example, a map image to be displayed is generated by assigning each unlocked airspace area indicated by the locked/unlocked state data Dg an unlocked airspace map image of that airspace area indicated by the unlocked map data Df, assigning each locked airspace area indicated by the locked/unlocked state data Dg a locked airspace map image of that airspace area indicated by the locked map data De, and combining the map images of the airspace areas. Thereafter, a label indicating the current location C is put on top of the map image based on the location of the player character PC indicated by the player character data Db, and displaying of the map image on the display 12 is controlled.

It should be noted that in the case in which only a portion of information is partially shown in an area for which map information thereof is locked, the locked map data De may be updated such that the information is displayed at the time when the information is revealed. For example, in the case in which information about constructions, roads, and the like that the player character PC has visited so far is displayed even for an area for which map information thereof is locked, when the player character PC newly visits another construction or road in step S122, the locked map data De may be updated such that map information (installation/construction information) of the newly visited construction or road is displayed.

Next, the processor 81 determines whether or not to end map displaying (step S132). For example, if the operation data Da indicates the user's operation input for ending map displaying or a predetermined period of time has passed since the start of map displaying, the result of the determination by the processor 81 in step S132 is positive. If the processor 81 determines to continue map displaying, the processor 81 proceeds to step S133. Otherwise, i.e., if the processor 81 determines to end map displaying, the processor 81 returns to and repeats step S122.

In step S133, the processor 81 determines whether or not an operation of switching maps has been performed. For example, if the operation data Da indicates an operation input for switching maps between an underground map, a ground map, and an airspace map (e.g., a map switching operation input of pressing down the up button 35 or down button 34 of the left controller 3), the result of the determination by the processor 81 in step S133 is positive. If the switching operation has been performed, the processor 81 proceeds to step S134. Otherwise, i.e., if the switching operation has not been performed, the processor 81 proceeds to step S135.

In step S134, the processor 81 performs a process of switching map fields to be displayed and displaying the chosen field, and proceeds to step S135. For example, the processor 81 performs control to display a map image of a field to be displayed that has been chosen according to the operation input for switching maps. It should be noted that the process of generating a map image of each field is similar to the process of performing map displaying in step S131, and therefore, will not be described in detailed.

In step S135, the processor 81 determines whether or not to move the player character PC to a location based on the map image by warp drive. For example, if the operation data Da indicates the user's choice operation input for choosing a mark for a construction or the like in an unlocked area in a displayed underground map, ground map image, or airspace map image, the result of the determination by the processor 81 in step S135 is positive. If the processor 81 determines to move the player character PC by warp drive, the processor 81 proceeds to step S136. Otherwise, i.e., if the processor 81 determines not to move the player character PC by warp drive, the processor 81 returns to and repeats step S132.

In step S136, the processor 81 moves the player character PC to the location chosen by the user by warp drive, and returns to and repeats step S122. For example, the processor 81 moves the player character PC to a location in the virtual space where the above construction on the map image chosen by the choice operation input (e.g., the inside or surroundings of the construction) by warp drive, sets the player character PC to a predetermined position after the warp drive, and updates the player character data Db.

Next, an example of various game processes of step S122 of FIG. 27, which are executed on a frame-by-frame basis, will be described with reference to FIG. 28. In each game process of step S122, the processor 81 executes a process illustrated in the flowchart of FIG. 28 on a frame-by-frame basis.

In FIG. 28, the processor 81 obtains operation data from the left controller 3, the right controller 4, and/or the main body apparatus 2, and updates the operation data Da (step S141), and proceeds to the next step.

Next, the processor 81 executes various game control processes (step S142), and proceeds to the next step.

As a first example of various game control processes in step S142, the processor 81 executes an item object installation process. An item object installation process executed as an example of various game control processes in step S142 will be described below with reference to FIG. 29.

In FIG. 29, the processor 81 determines, with reference to the equipment data Dh, whether or not an impact has been applied to the first item object OBJa (step S151). If an impact has not been applied to the first item object OBJa, the processor 81 proceeds to step S152. Otherwise, i.e., if an impact has been applied to the first item object OBJa, the processor 81 proceeds to step S153.

As a first example of the case in which it is determined in step S151 that an impact has been applied to the first item object OBJa, the result of the determination in step S151 is positive if an impact has been applied to the first item object OBJa by the player character PC's proximity attack action of attacking using a combination equipment object. For example, the result of the determination by the processor 81 in step S151 is positive based on the player character data Db if an impact has been applied to the first item object OBJa included in a combination equipment object (e.g., a sword object, spear object, or the like combined with the first item object OBJa) used in a proximity attack action due to hitting of the combination equipment object to another object.

As a second example of the case in which it is determined in step S151 that an impact has been applied to the first item object OBJa, the result of the determination in step S151 is positive if an impact has been applied to the first item object OBJa by the player character PC's attack action of attacking using an equipment object. For example, the result of the determination by the processor 81 in step S151 is positive based on the player character data Db and the not-installed item data Dk if an impact has been applied to the first item object OBJa placed on a game field (terrain object L) due to hitting of an equipment object used in an attack action to the first item object OBJa.

As a third example of the case in which it is determined in step S151 that an impact has been applied to the first item object OBJa, the result of the determination in step S151 is positive if an impact has been applied to the first item object OBJa by the player character PC's long-range attack action of attacking using a combination equipment object. For example, the result of the determination by the processor 81 in step S151 is positive based on the player character data Db if an impact has been applied to the first item object OBJa included in a combination equipment object (e.g., a bow and arrow object including an arrow object as the first item object OBJa) used in a long-range attack action due to hitting of at least a portion of the combination equipment object to another object (e.g., the terrain object L) after moving over a long distance.

In step S152, the processor 81 determines whether or not the first item object OBJa has hit another object at a travel speed higher than or equal to a first speed. If the first item object OBJa has hit another object at a travel speed higher than or equal to the first speed, the processor 81 proceeds to step S153. Otherwise, i.e., if the first item object OBJa has not hit another object at a travel speed higher than or equal to the first speed, the processor 81 proceeds to step S155.

As a first example of the case in which it is determined in step S152 that the first item object OBJa has hit at a speed higher than or equal to the first speed, the result of the determination in step S152 is positive if the first item object OBJa alone has moved and hit another object at a speed higher than or equal to the first speed in the virtual space. For example, the result of the determination by the processor 81 in step S152 is positive based on the not-installed item data Dk if due to the player character PC's action of releasing the first item object OBJa, the first item object OBJa has moved and hit the terrain object L at a speed higher than or equal to the first speed in the virtual space.

As a second example of the case in which it is determined in step S152 that the first item object OBJa has hit at a speed higher than or equal to the first speed, the result of the determination in step S152 is positive if at least a portion of a combination equipment object including the first item object OBJa has moved and hit another object at a speed higher than or equal to the first speed in the virtual space. For example, the result of the determination by the processor 81 in step S152 is positive based on the player character data Db if due to release of at least a portion (e.g., an arrow object combined with the first item object OBJa) of a combination equipment object (e.g., a bow and arrow object in which the first item object OBJa is combined with an arrow object) used in a long-range attack action, the first item object OBJa has moved and hit the terrain object L at a speed higher than or equal to the first speed in the virtual space.

In step S153, the processor 81 installs the second item object OBJb instead of the first item object OBJa, and proceeds to the next step. As a first example, if the equipment object used in the above attack action has hit the first item object OBJa placed on the terrain object L of the game field, so that an impact has been applied to the first item object OBJa, the processor 81 determines that the installation condition is satisfied, installs the second item object OBJb instead of the first item object on the terrain object L, and updates the not-installed item data Dk and the installed item data Dj. As a second example, if at least a portion of the combination equipment object used in the above attack action has hit another object (e.g., the terrain object L), so that an impact has been applied to the first item object OBJa included in the combination equipment object, the processor 81 determines that the installation condition is satisfied, changes the combination equipment object of the player character PC into an equipment object, installs the second item object OBJb on the terrain object L based on the hit location, and updates the equipment data Dh and the installed item data Dj. As a third example, if the first item object OBJa alone has hit another object (e.g., the terrain object L) at a speed higher than or equal to the first speed, the processor 81 determines that the installation condition is satisfied, installs the second item object OBJb instead of the first item object OBJa on the terrain object L based on the hit location, and updates the installed item data Dj and the not-installed item data Dk. As a fourth example, if at least a portion of a combination equipment object including the first item object OBJa has hit another object at a speed higher than or equal to the first speed (e.g., the terrain object L), the processor 81 determines that the installation condition is satisfied, changes at least a portion of the combination equipment object, which has hit, into an equipment object, installs the second item object OBJb on the terrain object L based on the hit location, and updates the equipment data Dh and the installed item data Dj.

Next, the processor 81 sets lighting based on the installed second item object OBJb (step S154), and ends the process of the flowchart. For example, the processor 81 sets a point light source or surface light source that emits predetermined light at the second item object OBJb, and updates the installed item data Dj.

As a second example of various game control processes of step S142, the processor 81 executes an item object removal process. An item object removal process that is executed as an example of various game control processes of step S142 will be described below with reference to FIG. 30.

In FIG. 30, the processor 81 determines, with reference to the installed item data Dj, whether or not a second item object OBJb has been installed on a game field (terrain object L) (step S155). If a second item object OBJb has been installed, the processor 81 proceeds to step S156. Otherwise, i.e., if a second item object OBJb has not been installed, the processor 81 ends the process of the flowchart.

In step S156, the processor 81 determines whether or not a condition for removing any installed second item object OBJb is satisfied. For example, the result of the determination by the processor 81 in step S156 is positive if a second item object OBJb has been installed to exceed an installation limitation or another character's action that leads to removal of a second item object OBJb has been performed. If the condition for removing any installed second item object OBJb is satisfied, the processor 81 proceeds to step S157. Otherwise, i.e., if the condition for removing any installed second item object OBJb is not satisfied, the processor 81 ends the process of the flowchart.

In step S157, the processor 81 removes a second item object OBJb that satisfies the removal condition, and ends the process of the flowchart. As a first example, if a second item object OBJb has been installed to exceed an installation limitation, the processor 81 removes the second item object OBJb exceeding the installation limitation from the virtual space in an FIFO fashion, and updates the installed item data Dj. As a second example, the processor 81 removes an installed second item object OBJb from the virtual space according to another character's action that leads to removal of the second item object OBJb, and updates the installed item data Dj.

As a third example of various game control processes of step S142, the processor 81 executes a player character action process. For example, the processor 81 sets the player character PC's action based on the operation data Da. As an example, the processor 81 sets the place, orientation, position, action, state, and the like of the player character PC based on an operation input indicated by the operation data Da and virtual physical calculation (e.g., virtual inertia and gravity) in the virtual space, and the like, and updates the player character data Db.

Actions performed by the player character PC include actions using an equipment object or a combination equipment object, and the like. For example, when the user provides an instruction to change equipment objects or combination equipment objects with which the player character PC is equipped, the processor 81 changes equipment objects or combination equipment objects possessed by the player character PC according to the instruction, and updates the equipment data Dh based on the change. In addition, the processor 81 causes the player character PC to perform an action of using an equipment object or a combination equipment object based on the equipment data Dh (e.g., attack by swinging a held equipment object or combination equipment object) according to the user's attack action instruction.

In addition, actions performed by the player character PC include an action of using an item object (e.g., the first item object OBJa alone) and the like. For example, when the user provides an instruction to set the player character PC's action of holding the first item object OBJa, the processor 81 sets the first item object OBJa according to the instruction such that the player character PC holds the first item object OBJa, sets a point light source or emission that emits weak light at the first item object OBJa, and updates the player character data Db and the not-installed item data Dk. It should be noted that even unless the above user's instruction has been provided, a point light source or emission that emits weak light when placed alone on the terrain object L may be set at the first item object OBJa. In addition, when the user provides an instruction to set an action of releasing the first item object OBJa held by the player character PC (e.g., the held first item object OBJa is dropped to the vicinity of the feet, the bottom of a cliff, or the like), the processor 81 causes the player character PC to perform the action set by the instruction, and updates the player character data Db. In addition, the processor 81 causes the released first item object OBJa to move in the virtual space, and updates the not-installed item data Dk. If the released first item object OBJa hits the terrain object L or the like before the first speed is reached, the processor 81 places the first item object OBJa at the hit location in a non-installation state, and updates the not-installed item data Dk.

As a fourth example of various game control processes in step S142, the processor 81 executes an other-character action process. For example, the processor 81 places a character other than the player character PC, controls an action of that other character according to a predetermined rule in a game program, and updates the other-character data Dc.

As a fifth example of various game control processes in step S142, when the player character PC is performing an action capable of producing a combination equipment object, the processor 81 executes a process of synthesizing a piece of equipment. For example, when in a game, the player character PC is allowed to use an item object and adopts a position to hold an equipment object, the processor 81 executes a process of synthesizing a piece of equipment. For example, the processor 81 chooses an item object to be used in an equipment synthesis process from item objects contained in the player character PC or item objects on a game field (terrain object L), based on the operation data Da, and combines an equipment object possessed by the player character PC with that item object, to synthesize a combination equipment object. Thereafter, the processor 81 changes that equipment object possessed by the player character PC to a combination equipment object (see FIGS. 17 and 20), and updates the equipment data Dh based on the change.

It should be noted that in the above process of synthesizing a piece of equipment, a scene may be displayed in which each object is controlled such that after an item object of interest is placed closer to an equipment object, the item object of interest is removed, and an equipment object of interest possessed by the player character PC is changed to a combination equipment object.

As a sixth example of various game control processes in step S142, the processor 81 executes a process of causing the player character PC to obtain the first item object OBJa based on the operation data Da. For example, when the player character PC performs an action of obtaining the first item object OBJa, the processor 81 adds the first item object OBJa obtained by the action to the player character PC, so that the first item object OBJa is contained in the player character PC, and updates the contained item data Di based on a state after the containing.

In addition, in various game control processes in step S142, in the case in which only a portion of information is partially shown in an area for which map information thereof is locked, the locked map data De may be updated such that the information is displayed at the time when the information is revealed. For example, in the case in which information about constructions, roads, and the like that the player character PC has visited so far is displayed even for an area for which map information thereof is locked, when the player character PC newly visits another construction or road in step S142, the locked map data De may be updated such that map information (installation/construction information) of the newly visited construction or road is displayed.

After various game control processes in step S142, the processor 81 executes a display control process (step S143), and proceeds to the next step. For example, the processor 81 disposes the player character PC and other characters, and objects such as the first item object OBJa and the second item object OBJb in the virtual space, based on the player character data Db, the other-character data Dc, the installed item data Dj, and the not-installed item data Dk. In addition, the processor 81 causes the player character PC to be equipped with an equipment object or a combination equipment object, based on the equipment data Dh. In addition, the processor 81 sets lighting in the virtual space by setting lighting (e.g., a light source) for each of the specific construction B, the first item object OBJa, the second item object OBJb, and the like based on the specific construction data Dd, the installed item data Dj, and the not-installed item data Dk, or using other light sources, environmental light, or the like in the virtual space. In addition, the processor 81 sets the location and/or orientation of a virtual camera for generating a display image, based on the virtual camera data Dm, and disposes the set virtual camera in the virtual space. Thereafter, the processor 81 performs control to generate an image of the virtual space as viewed from the virtual camera, and display the virtual space image on the display 12. It should be noted that the processor 81 may executes a process of controlling movement of the virtual camera in the virtual space, based on the place and position of the player character PC, and update the virtual camera data Dm. In addition, the processor 81 may move the virtual camera in the virtual space based on the operation data Da, and update the virtual camera data Dm.

Next, the processor 81 determines whether or not to end the game process (step S144). The game process in step S144 is ended, for example, if a condition for ending the game process is satisfied, the user has performed an operation of ending the game process, or the like. If the processor 81 determines not to end the game process, the processor 81 returns to and repeats step S141. If the processor 81 determines to end the game process, the processor 81 ends the process of the flowchart.

Thus, in the present example, by setting lighting that is set in the virtual space based on the specific construction B, lightness is ensured in a range based on the location of the specific construction B, which facilitates exploration of the range in the underground field.

The game system 1 may be any suitable apparatus, including a handheld game apparatus, or any suitable handheld electronic apparatus (a personal digital assistant (PDA), mobile telephone, personal computer, camera, tablet computer, etc.), etc.

In the foregoing, the information processes (game processes) are performed in the game system 1. Alternatively, at least a portion of the process steps may be performed in another apparatus. For example, when the game system 1 can also communicate with another apparatus (e.g., a server, another information processing apparatus, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above example, the information processes can be performed by the processor 81 of the game system 1 executing predetermined programs. Alternatively, all or a portion of the above processes may be performed by a dedicated circuit included in the game system 1.

Here, according to the above variation, the present example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and the present example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present example.

The above programs may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present example and common technical knowledge. It should be understood throughout the present specification that expression of a singular form includes the concept of its plurality unless otherwise mentioned. Specifically, articles or adjectives for a singular form (e.g., "a", "an", "the", etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present example pertain. If there is any inconsistency or conflict, the present specification (including the definitions) shall prevail.

As described above, the present example is applicable as a game program, game system, game apparatus, game processing method, and the like that are capable of facilitating exploration of a region in a virtual space.

What is claimed is:

1. A non-transitory computer-readable storage medium having stored therein a game program that when executed by a computer of an information processing apparatus, causes the computer to perform operations comprising:

performing movement control of a player character in a field in a virtual space, based on a user's operation input;

disposing at least one first type of object in the field;

setting lightness for the first type of object such that the first type of object itself emits light and is visually recognized even when the field is dark; and when the player character satisfies a first condition at a location where one of the at least one first type of object is disposed, setting lighting in the virtual space such that a range in the field including the location is lighter than before the first condition is satisfied.

2. The non-transitory computer-readable storage medium according to claim 1, wherein the game program further causes the computer to perform operations comprising:

for a field map indicating map information of the field, performing map image displaying so as to display an image not including first map information for a range in a first map state, and a map image including the first map information for a range in a second map state, according to the user's choice operation input; and when the first condition is satisfied, changing a range in the field map related to surroundings of the first type of object disposed at a location where the first condition is satisfied, from the first map state to the second map state.

3. The non-transitory computer-readable storage medium according to claim 2, wherein:

a damage area is set on a terrain object of the field,
the first map information includes map information indicating the damage area, and
the game program further causes the computer to perform operations comprising when it is determined that the player character has touched the damage area on the terrain object, reducing at least one of a physical strength value of the player character and the upper limit of the physical strength value.

4. The non-transitory computer-readable storage medium according to claim 2, wherein the game program further causes the computer to perform operations comprising when a mark indicating a location of the first type of object in a range of a displayed map image in the first map state is chosen based on the user's choice operation input, moving the player character to a location in the virtual space related to the chosen mark.

5. The non-transitory computer-readable storage medium according to claim 1, wherein:
a damage area is set on a terrain object of the field, and
the game program further causes the computer to perform operations comprising:
when it is determined that the player character has touched the damage area on the terrain object, reducing at least one of a physical strength value of the player character and the upper limit of the physical strength value; and
when the player character is disposed in a region around the first type of object after the first condition is satisfied, restoring at least one of the physical strength value of the player character and the upper limit of the physical strength value.

6. The non-transitory computer-readable storage medium according to claim 1, wherein the game program further causes the computer to perform operations comprising disposing a first item object possessed by the player character on a terrain object of the field, or disposing a second item object on a terrain object of the field instead of the first item object possessed by the player character, according to the player character's action in the virtual space, to set lighting in the virtual space such that a range around a location on the terrain object where the first or second item object is disposed is lighter than before the first or second item object is disposed.

7. The non-transitory computer-readable storage medium according to claim 6, wherein the game program further causes the computer to perform operations comprising:
executing a process of causing the player character to perform an action of launching the first item object in the virtual space, based on the user's operation input; and
installing the first or second item object at a location where the first item object launched according to the launching action has hit the terrain object.

8. A game system comprising:
a memory and a processor configured to at least:
perform movement control of a player character in a field in a virtual space, based on a user's operation input;
dispose at least one first type of object in the field;
set lightness for the first type of object such that the first type of object itself emits light and is visually recognized even when the field is dark; and
when the player character satisfies a first condition at a location where one of the at least one first type of object is disposed, set lighting in the virtual space such that a range in the field including the location is lighter than before the first condition is satisfied.

9. The game system according to claim 8, wherein the processor is further configured to at least:
for a field map indicating map information of the field, perform map image displaying so as to display an image not including first map information for a range in a first map state, and a map image including the first map information for a range in a second map state, according to the user's choice operation input; and
when the first condition is satisfied, change a range in the field map related to surroundings of the first type of object disposed at a location where the first condition is satisfied, from the first map state to the second map state.

10. The game system according to claim 9, wherein:
a damage area is set on a terrain object of the field,
the first map information includes map information indicating the damage area, and
the processor is further configured to at least reduce, when it is determined that the player character has touched the damage area on the terrain object, at least one of a physical strength value of the player character and the upper limit of the physical strength value.

11. The game system according to claim 9, wherein the processor is further configured to at least move, when a mark indicating a location of the first type of object in a range of a displayed map image in the first map state is chosen based on the user's choice operation input, the player character to a location in the virtual space related to the chosen mark.

12. The game system according to claim 8, wherein:
a damage area is set on a terrain object of the field, and
the processor is further configured to at least:
when it is determined that the player character has touched the damage area on the terrain object, reduce at least one of a physical strength value of the player character and the upper limit of the physical strength value; and
when the player character is disposed in a region around the first type of object after the first condition is satisfied, restore at least one of the physical strength value of the player character and the upper limit of the physical strength value.

13. The game system according to claim 8, wherein the processor is further configured to at least dispose a first item object possessed by the player character on a terrain object of the field, or dispose a second item object on a terrain object of the field instead of the first item object possessed by the player character, according to the player character's action in the virtual space, to set lighting in the virtual space such that a range around a location on the terrain object where the first or second item object is disposed is lighter than before the first or second item object is disposed.

14. The game system according to claim 13, wherein the processor is further configured to at least:
execute a process of causing the player character to perform an action of launching the first item object in the virtual space, based on the user's operation input; and
install the first or second item object at a location where the first item object launched according to the launching action has hit the terrain object.

15. A game apparatus, comprising:
a memory storing a program executable by a processor to perform operations comprising:
performing movement control of a player character in a field in a virtual space, based on a user's operation input;
disposing at least one first type of object in the field;

setting lightness for the first type of object such that the first type of object itself emits light and is visually recognized even when the field is dark; and when the player character satisfies a first condition at a location where one of the at least one first type of object is disposed, setting lighting in the virtual space such that a range in the field including the location is lighter than before the first condition is satisfied.

16. A game processing method for use with an information processing apparatus including a processor, the method comprising:

performing movement control of a player character in a field in a virtual space, based on a user's operation input;

disposing at least one first type of object in the field;

setting lightness for the first type of object such that the first type of object itself emits light and is visually recognized even when the field is dark; and when the player character satisfies a first condition at a location where one of the at least one first type of object is disposed, setting lighting in the virtual space such that a range in the field including the location is lighter than before the first condition is satisfied.

17. The game processing method according to claim 16, further comprising:

for a field map indicating map information of the field, performing map image displaying so as to display an image not including first map information for a range in a first map state, and a map image including the first map information for a range in a second map state, according to the user's choice operation input; and when the first condition is satisfied, changing a range in the field map related to surroundings of the first type of object disposed at a location where the first condition is satisfied, from the first map state to the second map state.

18. The game processing method according to claim 17, wherein:

a damage area is set on a terrain object of the field, the first map information includes map information indicating the damage area, and further comprising, when it is determined that the player character has touched the damage area on the terrain object, reducing at least one of a physical strength value of the player character and the upper limit of the physical strength value.

19. The game processing method according to claim 17, further comprising when a mark indicating a location of the first type of object in a range of a displayed map image in the first map state is chosen based on the user's choice operation input, moving the player character to a location in the virtual space related to the chosen mark.

20. The game processing method according to claim 16, further comprising disposing a first item object possessed by the player character on a terrain object of the field, or disposing a second item object on a terrain object of the field instead of the first item object possessed by the player character, according to the player character's action in the virtual space, to set lighting in the virtual space such that a range around a location on the terrain object where the first or second item object is disposed is lighter than before the first or second item object is disposed.

* * * * *